(12) United States Patent
Chen et al.

(10) Patent No.: US 11,768,591 B2
(45) Date of Patent: Sep. 26, 2023

(54) DYNAMIC GRAPHICAL CONTAINERS

(71) Applicant: Lucid Software, Inc., South Jordan, UT (US)

(72) Inventors: PinEn Chen, Draper, UT (US); Jarom Yan-Ming Chung, South Jordan, UT (US); Saurabh Sudhir Phadnis, Salt Lake City, UT (US); Cole Rosenberg, South Jordan, UT (US); Austin Row, Sandy, UT (US)

(73) Assignee: LUCID SOFTWARE, INC, South Jordan, UT (US)

( * ) Notice: Subject to any disclaimer, the term of this patent is extended or adjusted under 35 U.S.C. 154(b) by 265 days.

(21) Appl. No.: 17/239,227

(22) Filed: Apr. 23, 2021

(65) Prior Publication Data

US 2022/0342534 A1 Oct. 27, 2022

(51) Int. Cl.
*G06F 3/048* (2013.01)
*G06F 3/04845* (2022.01)
*G06F 40/177* (2020.01)
*G06F 3/0482* (2013.01)

(52) U.S. Cl.
CPC ........ *G06F 3/04845* (2013.01); *G06F 3/0482* (2013.01); *G06F 40/177* (2020.01)

(58) Field of Classification Search
CPC ... G06F 3/04845; G06F 40/177; G06F 3/0482
See application file for complete search history.

(56) References Cited

U.S. PATENT DOCUMENTS

| | | | | |
|---|---|---|---|---|
| 5,621,876 | A * | 4/1997 | Odam | G06F 40/18 715/788 |
| 7,164,410 | B2 * | 1/2007 | Kupka | G06F 3/04886 715/810 |
| 9,335,901 | B1 * | 5/2016 | Pantel | G06F 3/0481 |
| 10,908,803 | B1 | 2/2021 | Fieldman | |
| 2003/0065673 | A1 | 4/2003 | Grobler et al. | |
| 2006/0173873 | A1 * | 8/2006 | Prompt | G06F 16/284 |
| 2010/0318395 | A1 * | 12/2010 | Corneil | G06Q 10/0637 705/7.29 |
| 2012/0041920 | A1 * | 2/2012 | Kim | G06N 7/01 706/59 |
| 2015/0227703 | A1 * | 8/2015 | Kawanaka | G16H 30/20 715/771 |

(Continued)

OTHER PUBLICATIONS

International Search Report and Written Opinion, issued in corresponding application No. PCT/US2022/022128, dated Jul. 13, 2022.

*Primary Examiner* — David E Choi
(74) *Attorney, Agent, or Firm* — Maschoff Brennan

(57) ABSTRACT

In an example, a method to organize graphical objects includes displaying a graphical matrix in a graphical drawing canvas. The graphical matrix includes multiple rows and columns that intersect the rows. The method includes determining a value of a first attribute of each of multiple graphical objects. The method includes determining a value of a second attribute of each of the graphical objects. The method includes displaying the graphical objects arranged within the rows and the columns according to respective values of the first attribute and the second attribute of each of the graphical objects.

18 Claims, 22 Drawing Sheets

(56) References Cited

U.S. PATENT DOCUMENTS

| | | | |
|---|---|---|---|
| 2016/0012111 A1* | 1/2016 | Pattabhiraman | G06F 16/284 |
| | | | 707/722 |
| 2016/0026376 A1* | 1/2016 | Schultink | G06F 3/04842 |
| | | | 715/731 |
| 2017/0115837 A1* | 4/2017 | Drouin | G06F 3/0482 |
| 2017/0124053 A1 | 5/2017 | Campbell et al. | |
| 2018/0157468 A1 | 6/2018 | Stachura | |
| 2018/0239520 A1* | 8/2018 | Hinckley | G06F 3/0482 |
| 2018/0275762 A1* | 9/2018 | Freeman | G06F 3/0482 |
| 2020/0082583 A1* | 3/2020 | Williford | G06T 7/13 |
| 2021/0019287 A1 | 1/2021 | Prasad et al. | |
| 2022/0342534 A1* | 10/2022 | Chen | G06Q 10/101 |

\* cited by examiner

| | 302 | 304 | 306 | 308 | 310 | 312 |
|---|---|---|---|---|---|---|
| 314A Issue Type | Story | Bug | Task | Bug | Epic | Bug |
| 314B Issue Key | AUS-102 | AUS-103 | AUS-109 | AUS-112 | AUS-129 | AUS-151 |
| 314C Issue ID | IID1 | IID2 | IID3 | IID4 | IID5 | IID6 |
| 314D Summary | Spike: document creation api | Review performance of the signup pages | Update Scheduling Service | Increase load capacity for ML lambdas for recommendations | Approximate default language through browser + product language priorities | Dark mode option |
| 314E Assignee | Kirsten Kitchen | Kirsten Kitchen | Diego de Oliveira | Emily Lucidchart | Emily Lucidchart | Diego de Oliveira |
| 314F Assignee ID | AID1 | AID1 | AID2 | AID3 | AID3 | AID2 |
| 314G Reporter | Jarom Chung | Jarom Chung | Jarom Chung | Cole Rosenberg | Cole Rosenberg | Jarom Chung |
| 314H Reporter ID | RID1 | RID1 | RID1 | RID2 | RID2 | RID1 |
| 314I Priority | High | Medium | High | Low | Not Set | Not Set |
| 314J Status | In Progress | In Progress | In Progress | In Progress | Backlog | Done |
| 314K Resolution | | | | | | Done |
| 314L Created | date/time1 | date/time2 | date/time3 | date/time4 | date/time5 | date/time6 |
| 314M Updated | date/time7 | date/time8 | date/time9 | date/time10 | date/time11 | date/time12 |
| 314N Due Date | date/time13 | date/time14 | date/time15 | date/time16 | date/time17 | date/time18 |

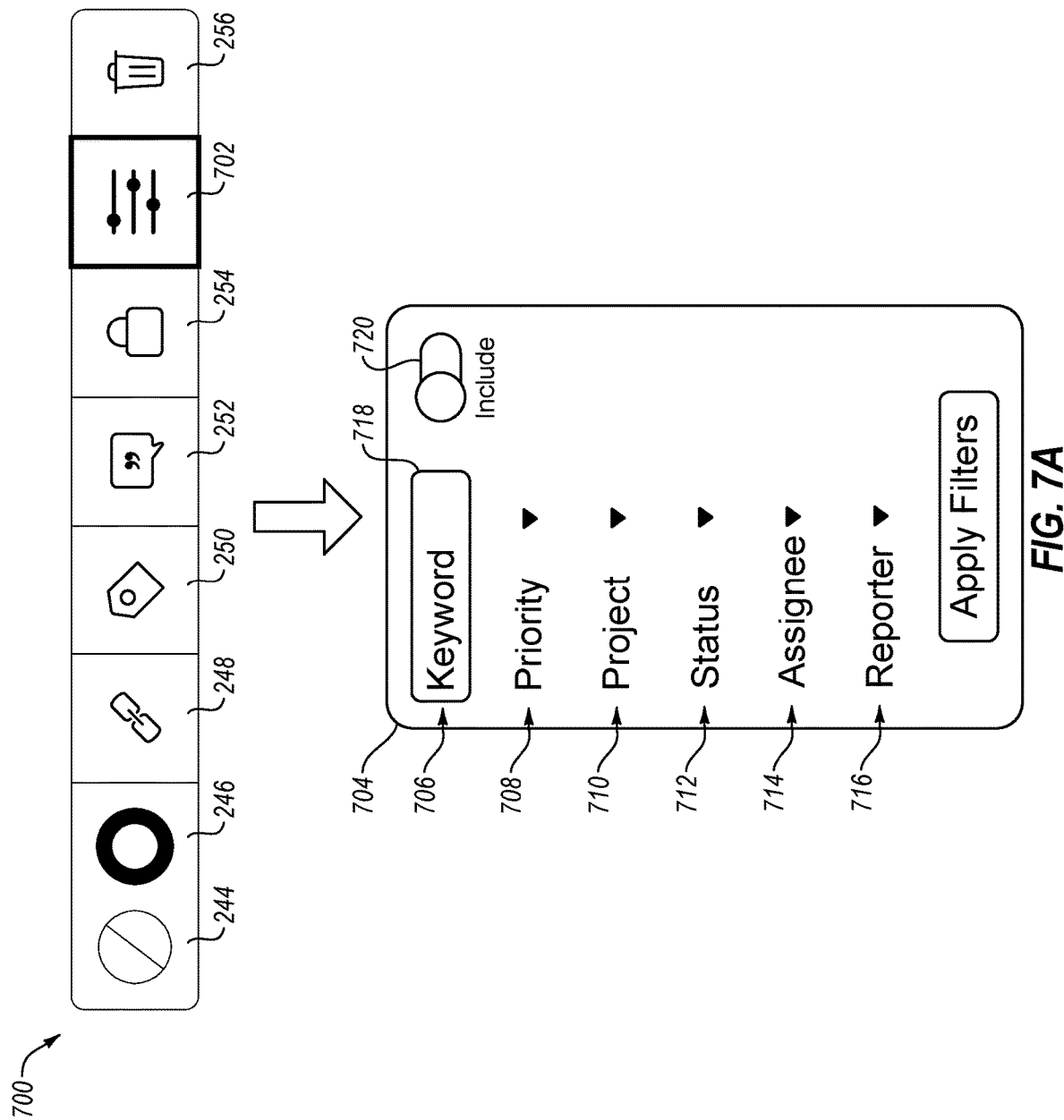

DYNAMIC GRAPHICAL CONTAINERS

FIELD

The embodiments discussed herein are related to dynamic graphical containers.

BACKGROUND

Unless otherwise indicated herein, the materials described herein are not prior art to the claims in the present application and are not admitted to be prior art by inclusion in this section.

Some online collaboration platforms are flexible, cloud-based environments that allow teams to communicate and collaborate in real time. Such platforms may provide an infinite scalable canvas and offer collaboration features like simultaneous editing, whiteboarding, diagramming, screen sharing, sticky notes, commenting, labeled cursors, text chat, and video and audio conferencing.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to organize graphical objects includes displaying a graphical matrix in a graphical drawing canvas. The graphical matrix includes multiple rows and columns that intersect the rows. The method includes determining a value of a first attribute of each of multiple graphical objects. The method includes determining a value of a second attribute of each of the graphical objects. The method includes displaying the graphical objects arranged within the rows and the columns according to respective values of the first attribute and the second attribute of each of the graphical objects.

In another example embodiment, a non-transitory computer-readable medium has computer-readable instructions stored thereon that are executable by a processor to perform or control performance of operations. The operations include displaying a graphical matrix in a graphical drawing canvas. The graphical matrix includes multiple rows and columns that intersect the rows. The operations include determining a value of a first attribute of each of multiple graphical objects. The operations include determining a value of a second attribute of each of the graphical objects. The operations include displaying the graphical objects arranged within the rows and the columns according to respective values of the first attribute and the second attribute of each of the graphical objects.

In another example embodiment, a system to display a graphical diagram includes a processor and a non-transitory computer-readable medium communicatively coupled to the processor. The non-transitory computer-readable medium has computer-readable instructions stored thereon that are executable by the processor to perform or control performance of operations. The operations include displaying a graphical matrix in a graphical drawing canvas. The graphical matrix includes multiple rows and columns that intersect the rows. The operations include determining a value of a first attribute of each of multiple graphical objects. The operations include determining a value of a second attribute of each of the graphical objects. The operations include displaying the graphical objects arranged within the rows and the columns according to respective values of the first attribute and the second attribute of each of the graphical objects.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 illustrates example attribute schemas for JIRA tickets represented by graphical objects of FIG. 2;

FIGS. 5C and 5D include the graphical representation of the UI of FIG. 2 that may also be used to convert graphical objects to different types;

FIG. 7A illustrates an example UI to filter graphical objects within a graphical matrix;

DETAILED DESCRIPTION OF SOME EXAMPLE EMBODIMENTS

Embodiments herein generally relate to dynamic graphical containers, and more specifically dynamic graphical matrices. Dynamic graphical containers such as dynamic graphical matrices (more generally "graphical matrices") may be implemented in collaboration or virtual whiteboard applications, intelligent diagramming applications, cloud visualization applications, or other applications. According to some embodiments, one or both axes of a graphical matrix may have an assigned attribute and data-backed graphical objects may be arranged within the graphical matrix according to respective values of their corresponding attributes. For example, if a first attribute is assigned to a horizontal axis of the graphical matrix, each graphical object with a first value for the first attribute may be arranged in a first column of the graphical matrix, each object with a second value for the first attribute may be arranged in a second column of the graphical matrix, and so on. As another example, if a second attribute is assigned to a vertical axis of the graphical matrix, each graphical object with a third value for the second attribute may be arranged in a first row of the graphical matrix, each object with a fourth value for the second attribute may be arranged in a second row of the graphical matrix, and so on. As used herein, terms such as "first", "second", "third", and so on are used to differentiate between different items as opposed to indicating ordinal positions of the items in a series unless context dictates otherwise.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
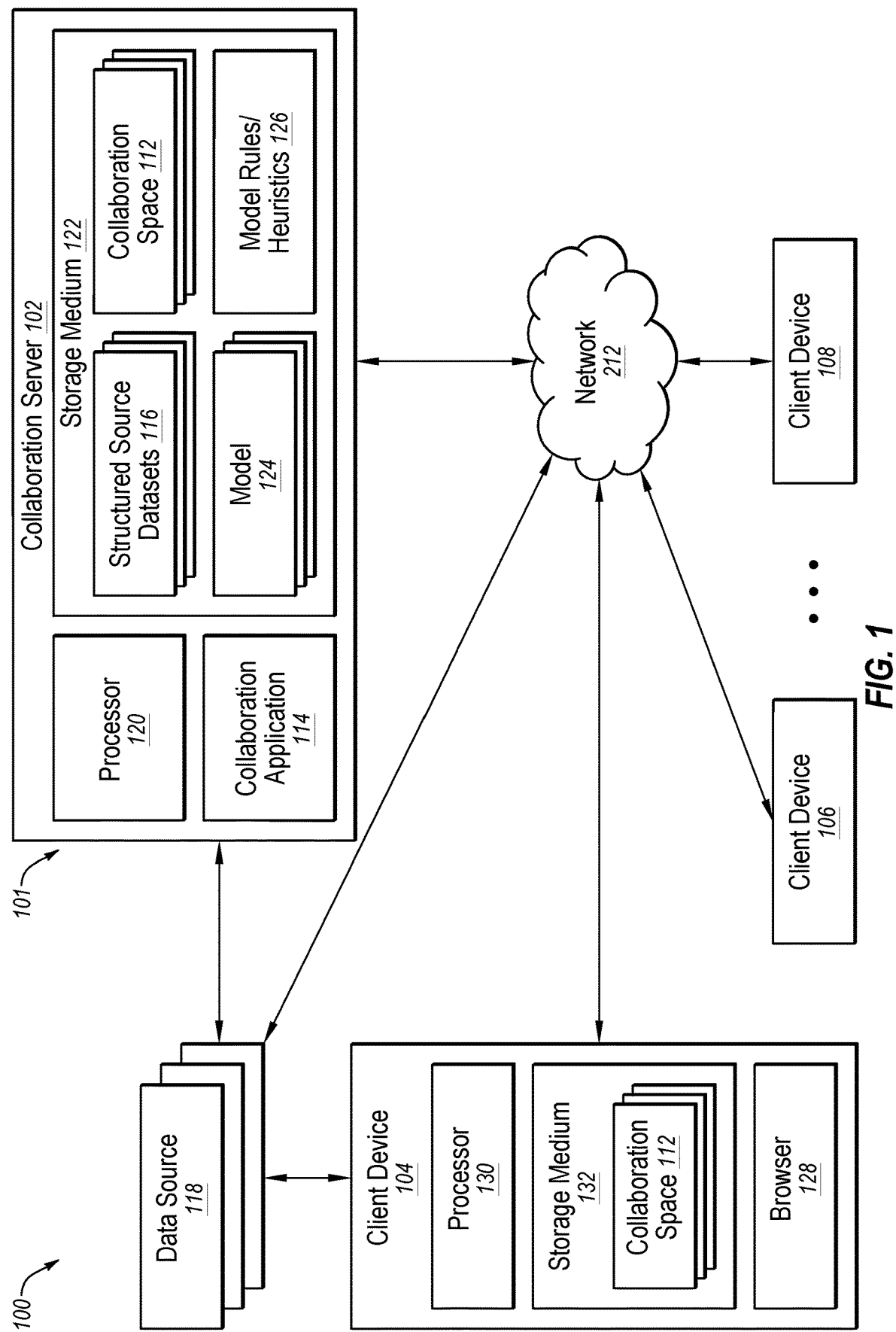
FIG. 1 is a block diagram of an example operating environment for an online collaboration platform.

FIG. 1 is a block diagram of an example operating environment 100 for an online collaboration platform 101, arranged in accordance with at least one embodiment described herein. The environment 100 includes a collaboration server (hereinafter "server") 102, one or more client devices 104, 106, 108, and a network 110.

In general, the network 110 may include one or more wide area networks (WANs) and/or local area networks (LANs) that enable the server 102 and the client devices 104, 106, 108, to communicate with each other. In some embodiments, the network 110 may include the Internet, including a global internetwork formed by logical and physical connections between multiple WANs and/or LANs. Alternately or additionally, the network 110 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 110 may also include servers that enable one type of network to interface with another type of network.

In some embodiments, the server 102 and/or the client devices 104, 106, 108 may be configured to allow users, e.g., users of the client devices 104, 106, 108, to communicate and collaborate online in real time. For example, the server 102 may generally host collaboration spaces or virtual whiteboards 112, each of which may be accessed by one or multiple users simultaneously or asynchronously via client devices 104, 106, 108. Within the collaboration spaces 112, users may generate graphical diagrams or visualizations with graphical objects or content authored by users via a collaboration application 114 hosted by the server 102. As an example, the collaboration application 114 may include a virtual whiteboard application such as LUCIDSPARK, MURAL, MIRO, CONCEPTBOARD, ZITEBOARD, MICROSOFT WHITEBOARD, or other virtual whiteboard application.

When multiple client devices 104, 106, 108 are simultaneously accessing the same collaboration space 112, the collaboration application 114 may show graphical objects or other content added, moved, or otherwise modified by a given user to other users. A collaboration space as used herein may refer to a document or other file that includes graphical objects generated, formatted, and/or grouped by users on a graphical drawing canvas. Alternatively or additionally, a collaboration space may include data collections and/or pointers to data collections used to generate, format, or group graphical objects.

Graphical objects generated within the collaboration spaces 112 may be simple graphical objects or data-backed graphical objects. Simple graphical objects may be stored within collaboration spaces 112 with various graphical attributes, such as shape, size, outline color, fill color, or other graphical attributes. Data-backed graphical objects may be explicitly stored as and/or represented by data collections in structured source data 116. Each data-backed graphical object may have a corresponding data collection or attribute schema in a set of structured source data 116 that explicitly identifies attributes of the graphical object, such as graphical attributes (e.g., fill color, outline color, shape) as well as other attributes such as an author of the graphical object, a tag applied to the graphical object, a number of votes from users, reactions from users, an author of each reaction (hereinafter "reactor"), text of or in the graphical object, or other attribute(s).

In some embodiments, data-backed graphical objects may be generated from structured source data of one or more data sources 118. Each of the data sources 118 may include, for example, issue tracking software such as JIRA SERVICE MANAGEMENT, ZENDESK, or FRESHDESK, a cloud infrastructure provider such as AWS, GOOGLE CLOUD, or MICROSOFT AZURE; a human resources (HR) system or database such as BAMBOOHR or WORKDAY; a customer relationship management (CRM) system such as SALESFORCE.COM or MICROSOFT DYNAMICS CRM; a spreadsheet for HR, e.g., with names, pictures, and/or a reporting structure for employees of an entity; a custom internal logging system; a floorplan database (e.g., with employee office/workstation assignments); a database schema (e.g., to generate Entity Relationship Diagrams); a service-oriented architecture; physical network discovery tools; custom-built technical systems that can be modeled similar to a network; or other suitable data source and/or data collection. The data in each of the data sources 118 may have a specific format, which may be different and/or the same from one data source 118 to another. Some example data formats include proprietary formats, Structured Query Language (SQL), and JavaScript Object Notation (JSON).

In embodiments in which the data-backed graphical objects are generated from structured source data of issue tracking software, the data collection or attribute schema of each of the data-backed graphical objects may include or identify attributes such as issue type, priority, project, status, assignee, reporter, due date, or other attribute. Alternatively or additionally, the data collection or attribute schema of each of the data-backed graphical objects may include one or more values for each attribute in the data collection or attribute scheme. Where a data-backed graphical object is generated from a JIRA issue, for instance, values for the issue type attribute may include Task, Sub-task, Story, Bug, Epic, or other value(s); values for the priority attribute may include Low, Medium, High, or other value(s); values for the project attribute may include one or more project names; values for the status attribute may include Backlog, Done, In Progress, or other value(s); values for the assignee attribute may include one or more names of individuals assigned to complete or address a given JIRA issue; values for the reporter attribute may include one or more names of individuals assigned to report on a given JIRA issue; values for the due date attribute may include a time and/or date in any suitable format.

Users may generate container graphical objects (hereinafter "containers") within the collaboration spaces 112, e.g., to organize other graphical objects. Containers may be simple containers or data-backed containers. An example of a data-backed container is a graphical matrix that can change dynamically as described in more detail elsewhere herein. Containers may organize or group simple or data-backed graphical objects based on some attribute of the graphical objects. For example, within a single data-backed container, graphical objects may be arranged in columns, rows, tabs, or a combination thereof based on attributes of the graphical objects. As another example, graphical objects may be grouped into different simple or data-backed containers based on attributes of the graphical objects. In these and other embodiments, when the attribute of one of the graphical objects is changed, the graphical object may be automatically moved from one column and/or row to another within the data-backed container or may be removed from the container and potentially placed in a different container based on the changed attributed.

Simple containers may have no responsiveness or less responsiveness to attribute changes of graphical objects than data-backed containers. In some embodiments, a given simple container may be unable to organize graphical objects within the simple container in columns, rows, tabs, or combinations thereof. However, when graphical objects are grouped into different simple containers based on an attribute and the attribute of a given graphical object is changed, the graphical object may be automatically moved from one corresponding simple container to another.

Simple containers and data-backed containers may behave similarly or differently. For example, data-backed containers may automatically resize to accommodate the addition or removal of a graphical object, whereas simple containers may not, e.g., simple containers may require manual resizing. Alternatively or additionally, a graphical object may be automatically removed from or added to a simple or data-backed container when a corresponding change to a corresponding attribute of the graphical object is made. Alternatively or additionally, a graphical object may be automatically removed from or added to a column, row, and/or tab within a data-backed container when a corresponding change to a corresponding attribute of the graphical object is made.

In some embodiments, graphical objects may be converted from simple graphical objects to data-backed graphical objects, e.g., by a user manually dragging a simple graphical object into a data-backed container. In this example, the user input (e.g., of dragging the simple graphical object into the data-backed container) may be effective to cause a data collection or attribute schema for the graphical object to be generated and added to the structured source data 116 for the collaboration space 112 such that the simple graphical object is converted to a data-backed graphical object. Alternatively or additionally, graphical objects may be converted from data-backed graphical objects to simple graphical objects, e.g., by a user manually dragging a data-backed graphical object out of a data-backed container into a simple container or into an area of the collaboration space 112 that is free of data-backed containers. In this example, the user input (e.g., of dragging the data-backed graphical object out of the data-backed container) may be effective to cause a data collection or attribute schema for the graphical object to be deleted from the structured source data 116 for the collaboration space 112 such that the data-backed graphical object is converted to a simple graphical object.

Collaboration spaces 112 generated by the collaboration application 114 may be exported to other systems or applications. In some embodiments, a collaboration space 112 may be exported along with its corresponding structured source data to another application.

In some embodiments, the collaboration application 114 may generate graphical diagrams or visualizations within the collaboration spaces 112 from structured source data of one or more of the data sources 118. In this and other examples, some of the sets of structured source data 116 may represent or be derived from corresponding ones of the data sources 118. Additional details regarding graphical diagrams or visualizations generated based on structured source data are disclosed in the following U.S. patent documents which are incorporated herein by reference in their entireties: U.S. Patent Pub. No. 20200004865 (U.S. application Ser. No. 16/024,533, filed Jun. 29, 2018), U.S. Patent Pub. No. 20200004866 (U.S. application Ser. No. 16/024,544, filed Jun. 29, 2018), U.S. Patent Pub. No. 20200004872 (U.S. application Ser. No. 16/024,551, filed Jun. 29, 2018), and U.S. application Ser. No. 16/796,757, filed Feb. 20, 2020.

Although one server 102 and three client devices 104, 106, 108 are illustrated in FIG. 1, the environment 100 may more generally include one or more servers 102 and one or more client devices 104, 106, 108. In these and other embodiments, the environment 100 may include other servers and/or devices not illustrated in FIG. 1.

In general, the server 102 may host the collaboration application 114 that allows the client devices 104, 106, 108 to collaborate online, including reflecting changes made to a collaboration space 112 at one of the client devices 104, 106, 108 to the others of the client devices 104, 106, 108. Alternatively or additionally, the collaboration application 114 may facilitate offline collaboration and/or may implement one or more aspects of U.S. Pat. No. 9,087,113 (U.S. application Ser. No. 14/046,818, filed Oct. 4, 2013) which is incorporated herein by reference in its entirety.

The server 102 may additionally include a processor 120 and a storage medium 122. The processor 120 may be of any type such as a central processing unit (CPU), a microprocessor (µP), a microcontroller (µC), a digital signal processor (DSP), or any combination thereof. The processor 120 may be configured to execute computer instructions that, when executed, cause the processor 120 to perform or control performance of one or more of the operations described herein with respect to the server 102.

The storage medium 122 may include any non-transitory computer-readable medium, including volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 122 may store computer instructions that may be executed by the processor 120 to perform or control performance of one or more of the operations described herein with respect to the server 102.

The storage medium 122 may additionally store the sets of structured source data 116, collaboration spaces 112, one or more models 124, and/or model rules and/or heuristics 126 ("Model Rules/Heuristics" in FIG. 1). Each set of structured source data 120 may be generated for the data-backed graphical objects and containers in a given collaboration space 112 and/or may be imported from a corresponding one of the data sources 118. The structured source data 120 may be imported over the network 110 or directly from the corresponding data source 118 if a direct connection exists.

The model rules and/or heuristics 126 include rules and/or heuristics that may be applied to the structured source data 116 to derive information about nodes and/or their relationships represented in the structured source data 116. The structured source data 116 and/or the information derived by the model rules and/or heuristics 126 may be used by the server 102 to generate the models 124, each model 124 corresponding to a different set of structured source data 116. Graphical diagrams within the collaboration spaces may be generated directly from a corresponding set of the structured source data 116 and/or from a corresponding one of the models 124 derived from the corresponding set of structured source data 116.

Each of the client devices 104, 106, 108 may execute an application, such as a browser 128, configured to communicate through the network 110 with the server 102. The browser 128 may include an Internet browser or other suitable application to communicate through the network 110 with the server 102. The browser 128 may generate, download and/or interact with collaboration spaces 112, structured source data 116, and/or graphical diagrams within the collaboration spaces 112. Each of the client devices 104, 106, 108 may include a desktop computer, a laptop computer, a tablet computer, a mobile phone, a smartphone, a personal digital assistant (PDA), a wearable device (e.g., a smart watch), an interactive whiteboard (e.g., SURFACE HUB) or another suitable client device.

Each of the client devices 104, 106, 108 may additionally include a processor and a storage medium, such as a processor 130 and a storage medium 132 as illustrated for the client device 104 in FIG. 1. Each of the other client devices 106, 108 may be similarly configured. Similar to the processor 120 of the server 102, the processor 130 may be of any type such as a CPU, a µP, a µC, a DSP, or any combination thereof. The processor 130 may be configured to execute computer instructions that, when executed, cause the processor 130 to perform or control performance of one or more of the operations described herein with respect to the client device 104 and/or the browser 128.

Similar to the storage medium 122 of the server 102, the storage medium 132 of the client device 104 may include any non-transitory computer-readable medium, including volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 132 may store computer instructions that may be executed by the processor 130 to perform one or more of the operations described herein with respect to the client device 104 and/or the browser 128. The storage medium 132 may additionally store, at least temporarily, a collaboration space 112, some of a corresponding set of structured source data 116 or model 124, and/or other content obtained from the server 102 and/or generated locally on the client device 104.

Embodiments described herein are not limited to using a browser to communicate with the server 102 to collaborate online with other users. For example, rather than or in addition to a browser, the client devices 104, 106, 108 may include a native app as are often used on client devices such as mobile devices including smartphones, tablet computers, and interactive whiteboards. Accordingly, embodiments described herein generally include collaborating online using a browser, a native app, or another suitable application on the client devices 104, 106, 108.

Some embodiments herein are discussed in the context of a collaboration or virtual whiteboard application such as LUCIDSPARK, which is provided by way of example. Other embodiments may be implemented in the context of other applications such as intelligent diagramming applications, cloud visualization applications, or other applications. A specific example of an intelligent diagramming application in which embodiments herein may be implemented is LUCIDCHART. A specific example of a cloud visualization application in which embodiments herein may be implemented is LUCIDCHART CLOUD INSIGHTS.

Figure 2:
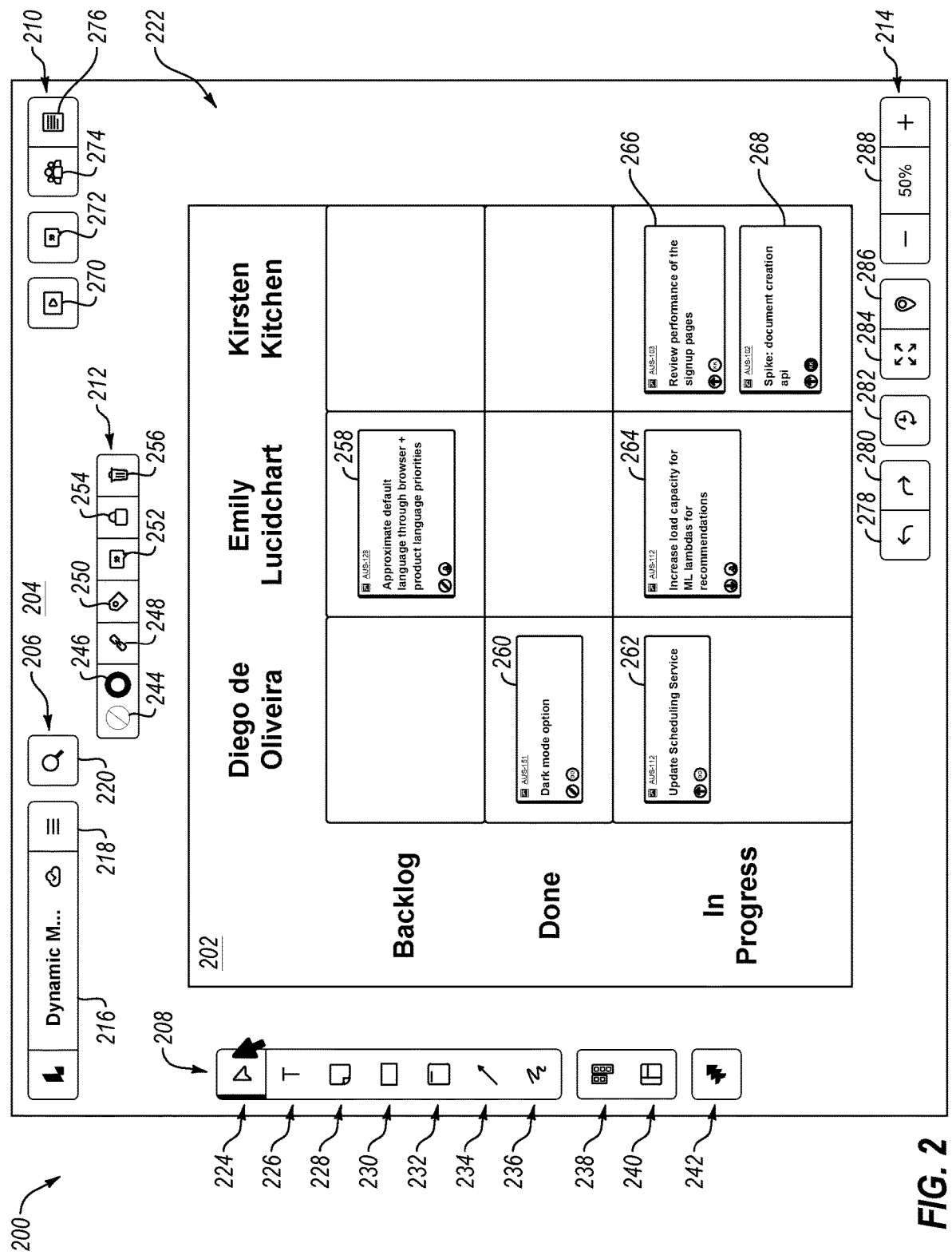
FIG. 2 includes a graphical representation of a user interface (UI) with an example graphical matrix.

FIG. 2 includes a graphical representation 200 of a UI with an example graphical matrix 202, arranged in accordance with at least one embodiment described herein. The UI may be provided by the browser 128 and/or the collaboration application 114 of FIG. 1. For instance, the browser 128 in cooperation with the collaboration application 114 may present the UI of FIG. 2 to a user through a display of the client device 104.

In FIG. 2, the graphical representation 200 includes a graphical drawing canvas 204 (hereinafter "canvas 204") and various menu bars 206, 208, 210, 212, 214. Each of the menu bars 206, 208, 210, 212 may be fixed or movable within the canvas 204. Alternatively or additionally, the UI may present one or more contextual formatting bars when a given graphical object has been selected or is being edited. The menu bar 212 is an example of a contextual formatting menu bar for a graphical matrix such as the graphical matrix 202. More generally, embodiments described herein include graphical drawing canvases with one or more menu bars (or other menu arrangements) that are fixed or movable within graphical drawing canvases or panels or other locations associated therewith, where the one or more menu bars (or other menu arrangement) include one or more of the menu options described with respect to the menu bars 206, 208, 210, 212, 214 or other menu bars.

The menu bar 206 includes a filename field, an additional options button 218, and a search field 220. The filename field 216 may display a filename of a collaboration space 222 or other document or file currently displayed in the canvas 204. Alternatively or additionally, a user may place their mouse cursor/pointer in the filename field 216 and begin typing or navigate a file system to open a different collaboration space, document, or file.

The additional options button 218 may be selected by the user to access additional options, such as file export (e.g., export the collaboration space 222 as one of various file types (e.g., pdf, png, svg, other LUCID software products, or the like)), file import (e.g., import a non-collaboration space file, e.g., from other LUCID software products, as a collaboration space), print, canvas options (snap to objects, show grid), and keyboard shortcuts.

Within the search field 220, the user may enter text to search the collaboration space 222 for matching text.

The menu bar 208 may generally include options to generate or arrange graphical objects. As illustrated, the menu bar 208 includes a cursor button 224, a text box button 226, a sticky note button 228, a shape button 230, a container button 232, a connector button 234, a freehand button 236, an organize ideas button 238, a template button 240, and an integration button 242.

The cursor button 224 may be selected by the user to select objects or activate other buttons.

The text box button 226 may be selected by the user to generate a text box.

The sticky note button 228 may be selected by the user to generate a sticky note. For example, selection of the sticky note button 228 may present a popup menu to the user that includes one or more of selectable sticky note colors, a quick sticky note field, or an upload option. Example aspects of sticky notes and other features described herein that may be implemented herein are described in U.S. Provisional Patent Application No. 63/087,764, filed Oct. 5, 2020 and U.S. Provisional Patent Application No. 63/091,848, filed Oct. 14, 2020, each of which is incorporated herein by reference in its entirety.

The shape button 230 may be selected by the user to generate graphical objects with predefined shapes or types, e.g., rectangle, diamond, circle, ellipse, bracket, etc., that may be presented to the user in a popup menu in response to selection of the shape button 224. In an example, when the popup menu is presented, the user may select an icon of the desired shape from the popup menu and may then move the cursor to a desired location and left click or provide other suitable input to generate a graphical object with the desired shape at the desired location.

The container button 232 may be selected by the user to generate containers.

The connector button 234 may be selected by the user to generate a connector. In some implementations, after selection of the connector button 234, a click and hold of the user's left mouse button (or other suitable input) may mark a start point of the connector and a release of the left mouse button (or other suitable input) may mark an endpoint of the connector with the connector generally being displayed as extending from the start point to the endpoint.

The freehand button 236 may be selected by the user to draw a freehand graphical object.

The organize ideas button 238 may be selected by the user to sort, gather, or cluster graphical objects into one or more containers based on one or more attributes of the graphical objects. For instance, a popup menu may be presented to the user in response to selection of the organize ideas button 238 and the popup menu may include options to sort, gather, or cluster on all graphical objects within the collaboration space 222 or on a selected subset of graphical objects within the collaboration space 222. Alternatively or additionally, the popup menu may include options to sort graphical objects within a single data-backed container into columns, rows, and/or tabs. Example aspects of sorting, gathering, and/or clustering that may be implemented herein are described in U.S. Provisional Patent Application No. 63/087,764 and U.S. Provisional Patent Application No. 63/091,848, each of which is incorporated herein by reference in its entirety. In some embodiments, the sorting, gathering, or clustering of graphical objects via the organize ideas button 238 may not apply to graphical objects within graphical matrices, such as the graphical matrix 202.

The template button 240 may be selected by the user to add a predefined collection of shapes, containers, or data-backed containers to the canvas. For instance, selection of the template button 240 may present a popup menu to the user that includes various templates the user can select to have the canvas 204 populated with the predefined collection.

The integration button 242 may be selected by the user to import data from a data source or to create new data for the data source. For example, the integration button 242 may be implemented as a JIRA integration button, selection of which may present a popup menu to the user that includes options to, e.g., import JIRA issues from a JIRA SERVICE MANAGEMENT data source, create new JIRA issues to add to the JIRA SERVICE MANAGEMENT data source, or the like.

The contextual formatting menu bar 212 may be displayed when the graphical matrix 202 is generated and/or while it is selected, e.g., for editing, and may disappear when the graphical matrix 202 is not selected. Other contextual formatting menu bars may be displayed when other graphical objects are displayed and/or selected and may have the same, similar, or different buttons as the contextual formatting menu bar 212. In this example, the graphical matrix 202 has just been generated or has been selected for editing. The contextual formatting menu bar 212 may include one or more of a fill color button 244, an outline color button 246, a linking button 248, a tagging button 250, a comment button 252, a lock button 254, and a delete button 256.

The fill color button 244 may be selected to set a fill color of the selected graphical object. For instance, selection of the fill color button 244 may present a popup menu to the user from which the user may select any of multiple colors. Selection of a color from the popup menu may then change the current fill color of the selected graphical object, e.g., the graphical matrix 202 in this example, to the selected color.

The outline color button 246 may be selected to set an outline color of the rows and columns of the graphical matrix 202. In the case of other graphical objects, the outline color button 246 may be selected to set an outline color of the other graphical objects. In some embodiments, selection of the outline color button 244 may present a popup menu to the user from which the user may select any of multiple colors. Selection of a color from the popup menu may then change the current outline color of the rows and columns of the graphical matrix 202 to the selected color.

The linking button 248 may be selected to link a URL to the graphical matrix 202 and/or to one or more graphical objects 258, 260, 262, 264, 266, 268 within the graphical matrix 202. For instance, selection of the linking button 248 may present a popup menu to the user in which the user may enter a URL, which may then be linked to the graphical matrix 202 and/or one or more of the graphical objects 258, 260, 262, 264, 266, 268. Each of the graphical objects 258, 260, 262, 264, 266, 268 may represent a different JIRA ticket at a JIRA SERVICE MANAGEMENT data source in this example.

The tagging button 250 may be selected to apply a tag to the graphical matrix 202 and/or to one or more of the graphical objects 258, 260, 262, 264, 266, 268 within the graphical matrix 202. Tags may be used for organizing or grouping graphical matrices or other graphical objects as described in U.S. Provisional Patent Application No. 63/087,764 and U.S. Provisional Patent Application No. 63/091,848, each of which is incorporated herein by reference in its entirety The comment button 252 may be selected to add comments to the collaboration space 222 and/or to view existing comments in the collaboration space 222. For example, selection of the comment button 252 may open a popup menu that includes a field to enter a comment. If the graphical matrix 202 or other graphical object has been selected when the comment is entered, the comment may be associated with the graphical matrix 202 or other graphical object. In some embodiments, a comment icon or other icon or visual cue may be included in the canvas 204 on or near graphical objects that have one or more comments to indicate the existence of the comments.

The lock button 254 may be selected to lock or unlock the graphical matrix 202 from or for editing. For example, if the graphical matrix 202 is currently unlocked and the lock button 254 is selected to lock the graphical matrix 202 from editing, the fill color button 244, the outline color button 246, and/or other buttons within the contextual formatting menu bar 212 may be hidden or inactivated and/or editing of the graphical matrix 202 may otherwise be prevented. Alternatively or additionally, if the graphical matrix is currently locked and the lock button 254 is selected to unlock the graphical matrix 202 for editing, all buttons of the contextual formatting menu bar 212 may be shown or activated or editing of the graphical matrix 202 may otherwise be enabled.

The delete button 256 may be selected to delete the graphical matrix 202.

The particular options or buttons included in the contextual formatting menu bar 212 may vary depending on the selected graphical object. For example, the fill color button 244 may be included in the contextual formatting menu bar 212 when the selected graphical object is a sticky note or other graphical object that has a fill color, but may be omitted from the contextual formatting menu bar 212 when the selected graphical object is a connector or other graphical object that lacks a fill color. The contextual formatting menu bar 212 may disappear when no graphical object is selected.

The menu bar 210 may include one or more of a presentation builder button 270, a comment button 272, a team tools button 274, and a notes button 276.

The presentation builder button 270 may be selected to build a presentation, such as a slideshow presentation, from content in the collaboration space 222. For example, selection of the presentation builder button 270 may present an option to "Add new slide". Selection of the "Add new slide" option may create a slide with content from the collaboration space 222. In some embodiments, the user may select the particular content to include in each new slide or the particular content to include in each new slide may be selected in some other manner.

The comment button 272 may operate the same as or similar to the comment button 252 to add comments to individual graphical objects within the collaboration space 222 and/or to the collaboration space 222 itself. For example, selection of the comment button 272 may open a popup menu that includes a field to enter a comment. If no graphical object has been selected and the comment is entered, the comment may be associated with the collaboration space 222 as a whole. If a graphical object has been selected when the comment is entered, the comment may be associated with the selected graphical object. In some embodiments, a comment icon or other icon or visual cue may be included in the canvas 204 on or near graphical objects that have one or more comments to indicate the existence of the comments.

The team tools button 274 may be selected to access one or more team tools. The team tools may include, for example, a timer, voting, color (or other visual attribute) assignments, and/or breakout boards. For example, selection of the team tools button 274 may open a popup menu that includes the various team tools, selection of which may open a corresponding popup menu to set a timer, create a voting session, make color (or other visual attribute) assignments to users, or creating one or more breakout boards. Setting a timer may help keep participating users engaged and focused. A voting session may allow voting to be used to capture the users' thoughts and opinions. The assignment of colors or other visual attributes to users (or authors) may be used to distinguish content and/or activity of different users. The breakout boards may provide separate spaces for focused small group work.

The notes button 276 may be selected to create notes. For example, selection of the notes button 276 may open a notes bar in which the user may add notes. The notes in the notes bar may be kept private for the user.

The menu bar 214 may include one or more of an undo button 278, a redo button 280, a revision history button 282, a full-screen button 284, a minimap button 286, and zoom buttons/field (hereinafter "zoom") 288.

The undo button 278 may be selected by the user to undo an immediately preceding operation of the user in the collaboration space 222. Selection of the undo button 278 N times in series may undo the preceding N operations of the user in the collaboration space 222 where N is a number that is less than or equal to a maximum number of user operations stored in memory of the collaboration application 114 or locally at the client device 104.

The redo button 280 may be selected by the user to redo an immediately preceding operation of the user in the collaboration space 222. Selection of the redo button 280 N times in series may redo the immediately preceding operation N times.

The revision history button 282 may be selected by the user to access a popup window that includes a list of revisions of the collaboration space 222. Selection of a given one of the revisions from the list may revert the collaboration space 222 to the selected revision. Each revision may include a point-in-time version of the collaboration space 222 taken periodically, randomly, after every user operation, after every series of two or more user operations, or at some other interval or according to some other schedule.

The full-screen button 284 may be selected to change to full-screen view. When in the full-screen view, the full-screen button 284 may be replaced by a reduce screen button that may be selected to exit the full-screen view.

The minimap button 286 may be selected to get an overview of the entire collaboration space 222 with an area of the collaboration space 222 that is currently in view highlighted. The overview shown when the minimap button 286 is selected may allow users to more easily locate and navigate to content within the collaboration space 222 that may not initially be in view.

The zoom 288 may include a zoom-in button ("−" in FIG. 2) to zoom in on the collaboration space 222, a zoom-out button ("+" in FIG. 2) to zoom out on the collaboration space 222, and a zoom level field (illustrates as "50%" in FIG. 2)

that may indicate the current zoom level and/or within which the user may type a value of a desired zoom level to change the zoom to the desired zoom level without using the zoom-in or zoom-out buttons.

According to embodiments herein, a different attribute may be assigned to each of the axes of the graphical matrix 202 and respective values of the attributes for the graphical objects 258, 260, 262, 264, 266, 268 may be used to arrange them within the graphical matrix 202. In the illustrated embodiment, the attributes assigned to the axes are an assignee attribute assigned to the horizontal axis and a status attribute assigned to the vertical axis. In some embodiments, possible values for each of the assigned attributes may be listed along the corresponding axis. For example, possible values for the assignee attribute assigned to the horizontal axis are listed along the horizontal axis in FIG. 2 and include "Diego de Oliveira", "Emily Lucidchart", and "Kirsten Kitchen", each corresponding to a different column in the graphical matrix 202. As another example, possible values for the status attribute assigned to the vertical axis are listed along the vertical axis in FIG. 2 and include "Backlog", "Done", and "In Progress", each corresponding to a different row in the graphical matrix 202.

Embodiments herein may arrange the graphical objects 258, 260, 264, 266, 268 within the graphical matrix 202 according to values of the attributes assigned to the axes of the graphical matrix 202 for each of the graphical objects 258, 260, 262, 264, 266, 268. For example, each graphical object that has a value of "Diego de Oliveira" for its assignee attribute may be positioned within the "Diego de Oliveira" column of the graphical matrix 202. Similarly, each graphical object that has a value of "Emily Lucidchart" or "Kirsten Kitchen" for its assignee attribute may be positioned within, respectively, the "Emily Lucidchart" column or the "Kirsten Kitchen" column of the graphical matrix 202. Similarly, each graphical object that has a value of "Backlog", "Done", or "In Progress" for its status attribute may be positioned within, respectively, the "Backlog" row, the "Done" row, or the "In Progress" row of the graphical matrix 202. Accordingly, the intersection of each row with each column forms a cell within which any graphical object that has corresponding values for the assignee and status attributes may be positioned. For example, the graphical object 258 has a value of "Emily Lucidchart" for its assignee attribute and a value of "Backlog" for its status attribute such that it is positioned in the cell formed at the intersection of the "Emily Lucidchart" column with the "Backlog" row. The other graphical objects 260, 262, 264, 266, 268 are similarly positioned in cells formed at a corresponding intersection of a corresponding column with a corresponding row.

Arranging graphical objects within rows, columns, and/or cells of a graphical matrix such as the graphical matrix 202 according to values of attributes assigned to axes of the graphical matrix and/or other methods or operations herein may be facilitated by use of data collections and/or attribute schemas such as may be included in the structured source data 116. Example attribute schemas will now be discussed with respect to FIG. 3.

FIG. 3 illustrates example attribute schemas 302, 304, 306, 308, 310, 312 for JIRA tickets represented by the graphical objects 258, 260, 262, 264, 266, 268 of FIG. 2, arranged in accordance with at least one embodiment described herein. In particular, the attribute schema 302 is the attribute schema of a first JIRA ticket represented by the graphical object 268, the attribute schema 304 is the attribute schema of a second JIRA ticket represented by the graphical object 266, the attribute schema 306 is the attribute schema of a third JIRA ticket represented by the graphical object 262, the attribute schema 308 is the attribute schema of a fourth JIRA ticket represented by the graphical object 264, the attribute schema 310 is the attribute schema of a fifth JIRA ticket represented by the graphical object 258, and the attribute schema 312 is the attribute schema of a sixth JIRA ticket represented by the graphical object 260.

In general, each of the attribute schemas 302, 304, 306, 308, 310, 312 includes values of corresponding attributes 314 for the corresponding JIRA ticket represented by the corresponding graphical object. For example, the attribute schema 302 includes, for the first JIRA ticket represented by the graphical object 268, values of Story, AUS-102, IID1 (e.g., issue ID 1), "Spike: document creation api", Kirsten Kitchen, AID1 (e.g., assignee ID 1), Jarom Chung, RID1 (e.g., reporter ID 1), High, In Progress, date/time1, date/time2, and date/time 13 for, respectively, an Issue Type attribute 314A, an Issue Key attribute 314B, an Issue ID attribute 314C, a Summary attribute 314D, an Assignee attribute 314E, an Assignee ID attribute 314F, a Reporter attribute 314G, a Reporter ID attribute 314H, a Priority attribute 314I, a Status attribute 314J, a Created attribute 314L, an Updated attribute 314M, and a Due Date attribute 314N of the first JIRA ticket. In this example, the first JIRA ticket lacks a value for a Resolution attribute 314K as indicated by the lack of a value in the corresponding location of the attribute schema 302.

In some embodiments, the attribute schemas 302, 304, 306, 308, 310, 312 (together with implied or explicit names of each of the attributes 314) may be stored together in any suitable data structure. The attribute schemas 302, 304, 306, 308, 310, 312 and the attributes 314 of FIG. 3 are collectively referred to hereinafter as structured source data 300.

Attribute schemas or data collections such as those depicted in FIG. 3 may be generated or derived from, e.g., any of the data sources 118 of FIG. 1. Alternatively or additionally, such attribute schemas may be stored or included in, e.g., the structured source data 116 of FIG. 1. Moreover, the attribute schemas of FIG. 3 are relatively simple examples of attribute schemas for JIRA tickets. Embodiments herein may alternatively or additionally include attribute schemas or data collections for other types of data objects (e.g., other than JIRA tickets) from other data sources (e.g., other than JIRA SERVICE MANAGEMENT), with identical, similar, different, more, and/or fewer attributes than those depicted in FIG. 3.

Figure 4A:
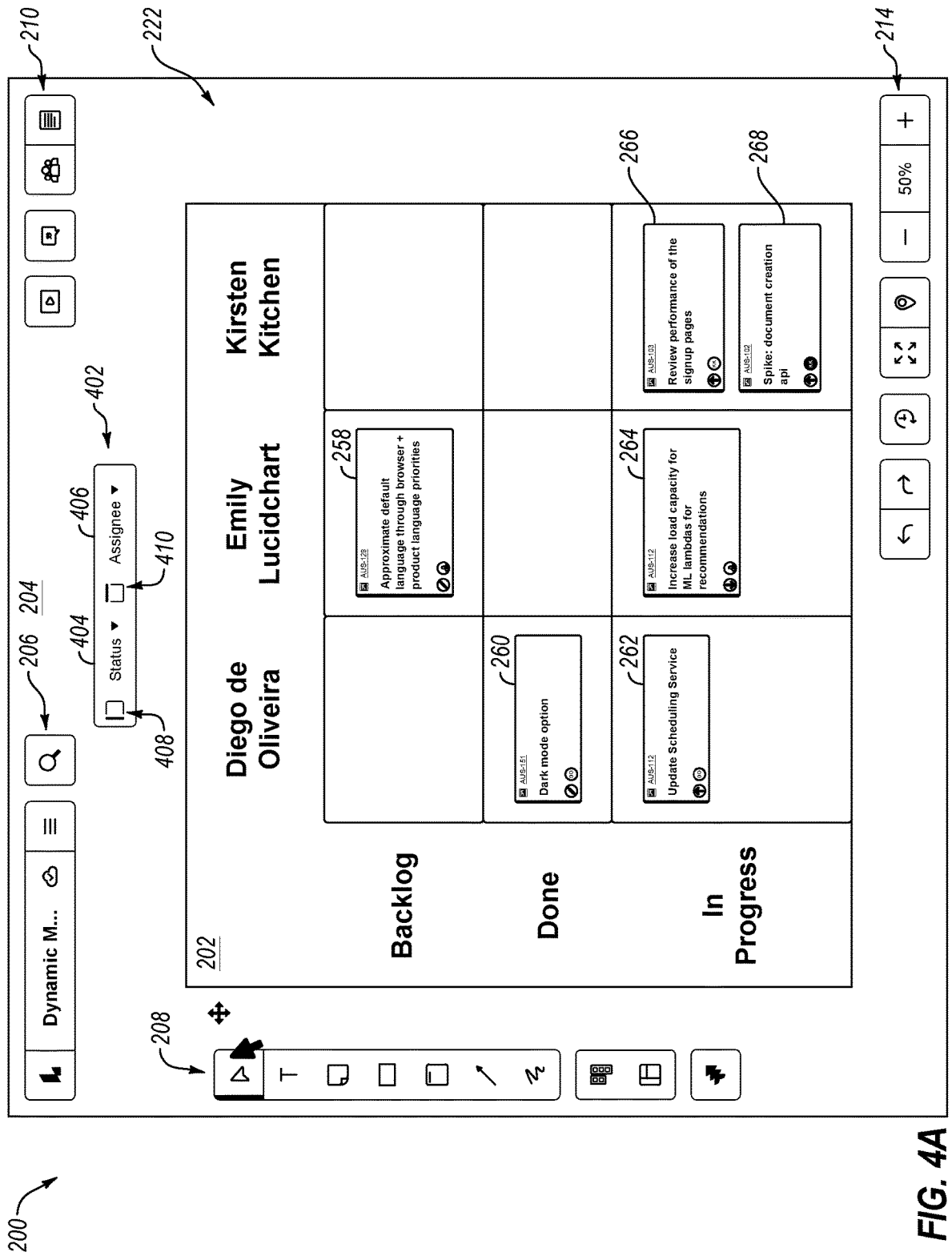
FIG. 4A includes the graphical representation of the UI of FIG. 2 with an attribute assignment bar to assign attributes to axes of the graphical matrix of FIG. 2.

FIG. 4A includes the graphical representation 200 of the UI of FIG. 2 with an attribute assignment bar 402 to assign attributes to axes of the graphical matrix 202, arranged in accordance with at least one embodiment described herein. In some embodiments, the contextual formatting menu bar 212 and the attribute assignment bar 402 may be displayed simultaneously. In some embodiments, the contextual formatting menu bar 212 and the attribute assignment bar 402 may be displayed in a mutually exclusive manner (e.g., only one at a time) and/or in response to different inputs and/or different series of inputs. For example, the contextual formatting menu bar 212 may be displayed in response to a single left mouse click when the mouse cursor is on the graphical matrix 202 and the attribute assignment bar 402 may be displayed in response to a double mouse click when the mouse cursor is on the graphical matrix 202.

The attribute assignment bar 402 may include a vertical axis drop down menu 404 and a horizontal axis drop down menu 406. When the drop down menus 404, 406 are collapsed as illustrated in FIG. 4A, the displayed text may indicate the particular attribute assigned to the corresponding axis of the graphical matrix 202. For example, in FIG. 4A, the text "Status" next to a vertical axis icon 408 included in the vertical axis drop down menu 404 may indicate that the Status attribute is currently assigned to the vertical axis of the graphical matrix 202. Similarly in FIG. 4A, the text "Assignee" next to a horizontal axis icon 410 included in the horizontal axis drop down menu 406 may indicate that the Assignee attribute is currently assigned to the horizontal axis of the graphical matrix 202.

Accordingly, the arrangement of the graphical objects 258, 260, 262, 264, 266, 268 within the rows and columns of the graphical matrix 202 is determined by their values of the Status attribute and the Assignee attribute. That is, e.g., each graphical object 258, 264 with an Assignee attribute of Diego de Oliveira, Emily Lucidchart, or Kirsten Kitchen and a Status attribute of Backlog, Done, or In Progress is arranged in the corresponding column and row of the graphical matrix 202. For example, with combined reference to FIGS. 3 and 4, it can be seen from the attribute schemas 312, 306 of FIG. 3 that the graphical objects 262, 260 representing the sixth and third JIRA tickets discussed with respect to FIG. 3 each has a value of Diego de Oliveira for the Assignee attribute 314E and is therefore arranged in the Diego de Oliveira column of the graphical matrix 202 in FIG. 4A. All of the graphical objects 258, 260, 262, 264, 266, 268 are similarly arranged in the appropriate row and column of the graphical matrix 202 of FIG. 4A according to their respective values for the Status attribute 314J and the Assignee attribute 314E.

FIGS. 4B-4F show examples of how attribute assignments to the horizontal and vertical axes of the graphical matrix 202 may be changed. Attribute assignments to axes of other graphical matrices may be implemented in the same, similar, or different manner.

Figure 4B:
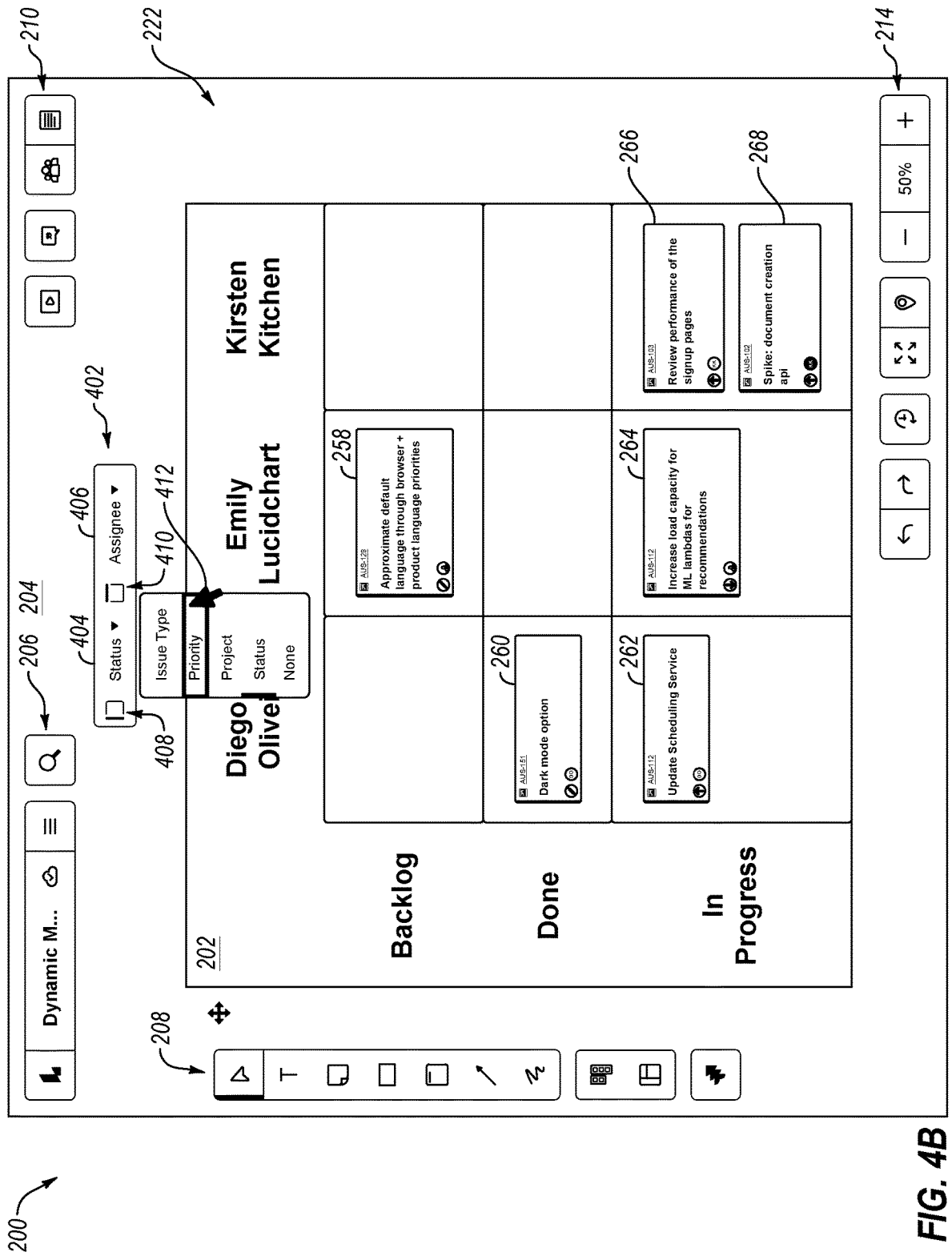
FIGS. 4B-4F show examples of how attribute assignments to horizontal and vertical axes of the graphical matrix of FIG. 2 may be changed.

FIG. 4B shows an example of the vertical axis drop down menu 404 in an expanded state. As shown, various attributes are listed in the vertical axis drop down menu 404 which a user can select to assign to the vertical axis. Each of the attributes in the vertical axis drop down menu 404 may be highlighted in some manner when a mouse cursor 412 hovers or is positioned over the attribute. For example, in FIG. 4B, the mouse cursor 412 is positioned over the Priority attribute which is highlighted in the vertical axis drop down menu 404.

Figure 4C:
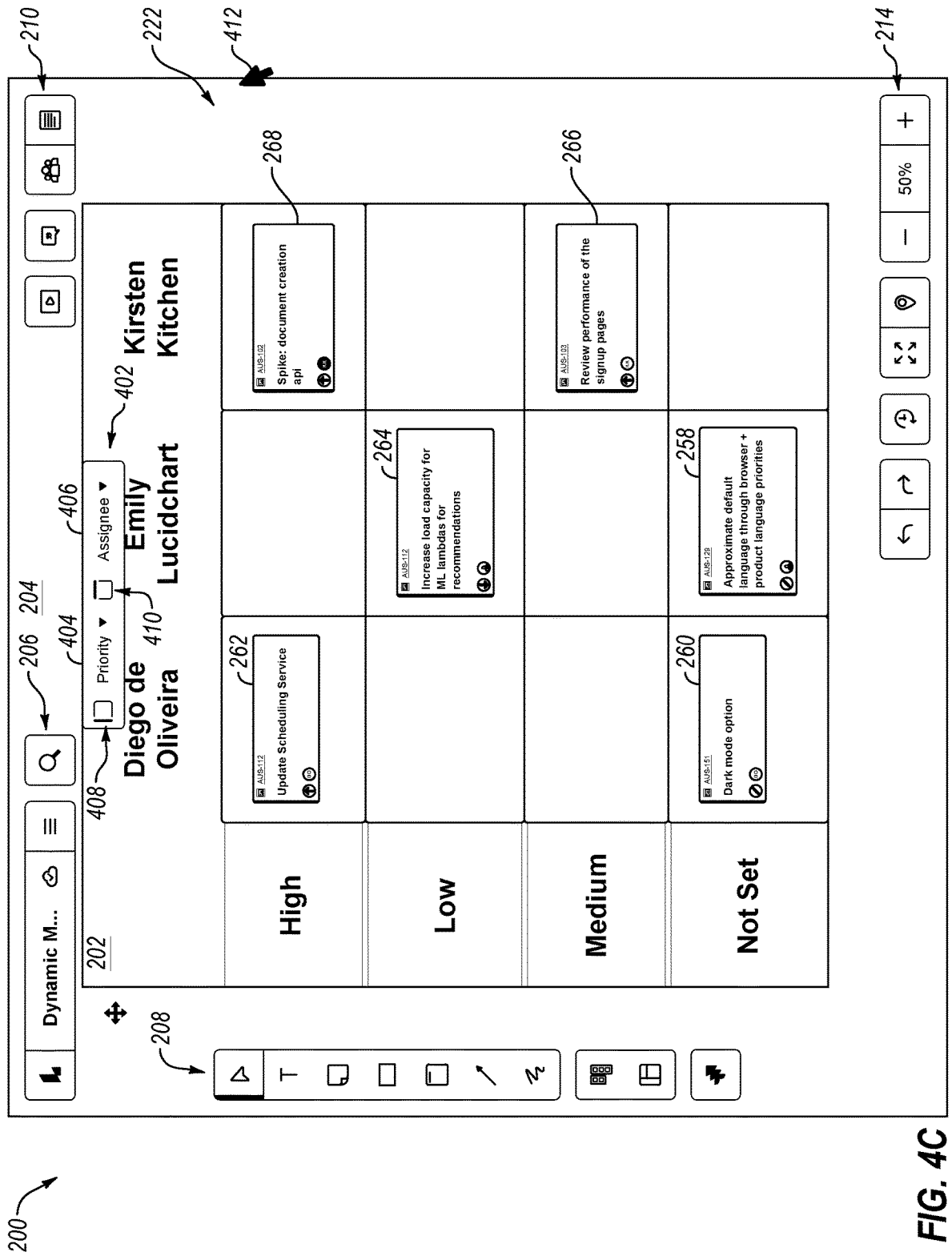

FIG. 4C shows an example of the graphical matrix 202 if the Priority attribute is assigned to the vertical axis while the Assignee attribute remains assigned to the horizontal axis of the graphical matrix 202. With combined reference to FIGS. 4B and 4C, the graphical matrix 202 may be rearranged when the attribute assigned to an axis (the vertical axis in this example) is changed. For example, a number of rows (or columns) may be changed if the number of possible values of the attribute newly assigned to the vertical (or horizontal) axis of the graphical matrix 202 is different than the number of values of the attribute previously assigned to the axis and/or the labels for each of the rows (or columns) may be changed to include or correspond to the values of the attribute newly assigned to the axis. In this example, since the Priority attribute has four possible values (High, Low, Medium, and Not Set) as may be determined from the attribute schemas of FIG. 3 and the Status attribute has only three, the graphical matrix 202 in FIG. 4C is rearranged compared to FIG. 4B to include four rows with new labels corresponding to the possible values of the Priority attribute.

In addition, after or simultaneous with rearranging the graphical matrix 202, the graphical objects 258, 260, 262, 264, 266, 268 may be rearranged within the rows and columns of the rearranged graphical matrix 202 according to respective values of the attribute newly assigned to the axis. For example, with combined reference to FIGS. 3 and 4C, it can be seen from the attribute schemas 306, 302 of FIG. 3 that the graphical objects 262, 268 representing the third and first JIRA tickets discussed with respect to FIG. 3 each has a value of High for the Priority attribute 314I and is therefore arranged in the High row of the rearranged graphical matrix 202 in FIG. 4C. All of the graphical objects 258, 260, 262, 264, 266, 268 are similarly rearranged in the appropriate row and column of the rearranged graphical matrix 202 of FIG. 4C according to their respective values for the Priority attribute 314I and the Assignee attribute 314E.

Figure 4D:
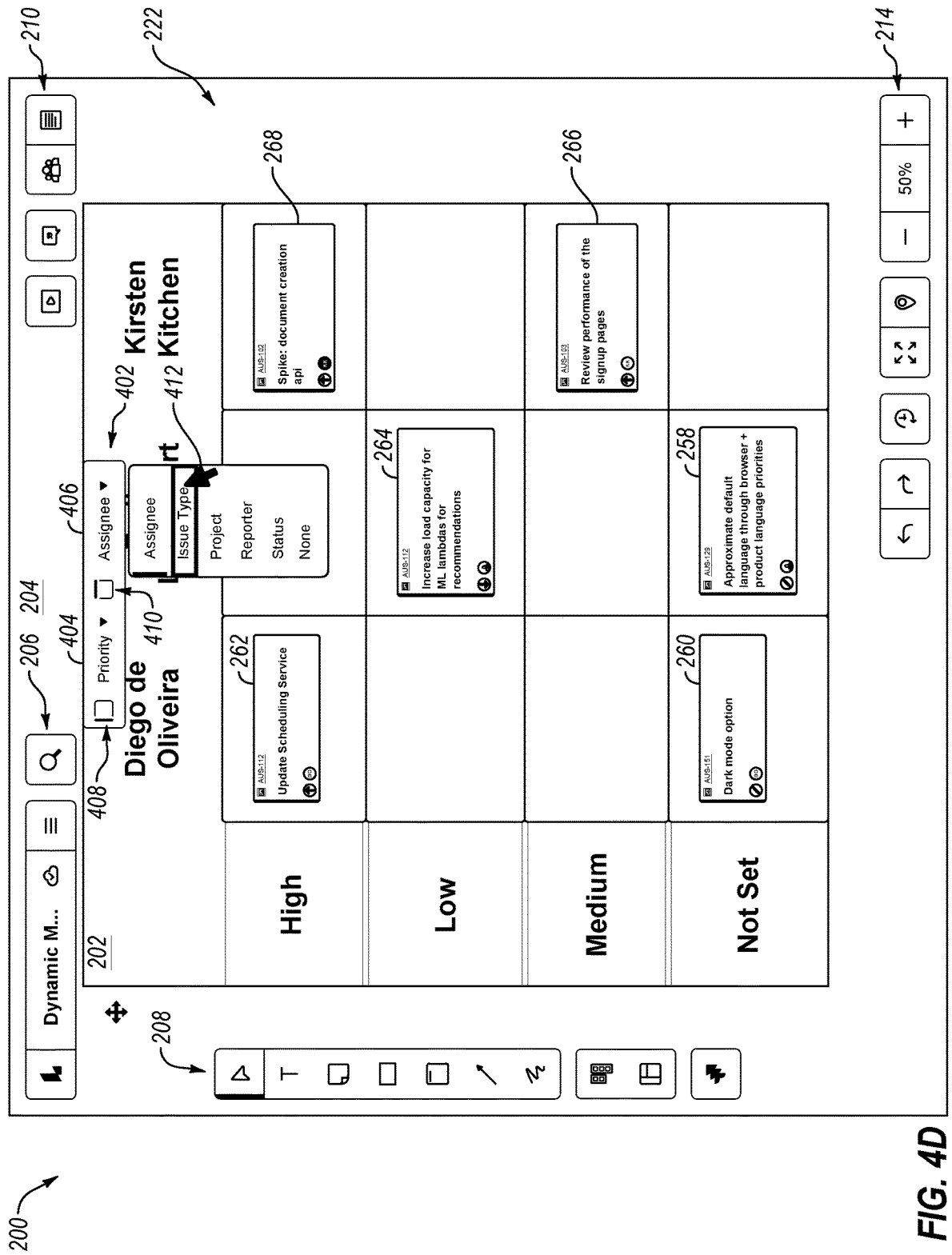

FIG. 4D shows an example of the horizontal axis drop down menu 406 in an expanded state. As shown, various attributes are listed in the horizontal axis drop down menu 406 which a user can select to assign to the horizontal axis. Each of the attributes in the horizontal axis drop down menu 406 may be highlighted in some manner when the mouse cursor 412 hovers or is positioned over the attribute. For example, in FIG. 4D, the mouse cursor 412 is positioned over the Issue Type attribute which is highlighted in the horizontal axis drop down menu 406.

Figure 4E:
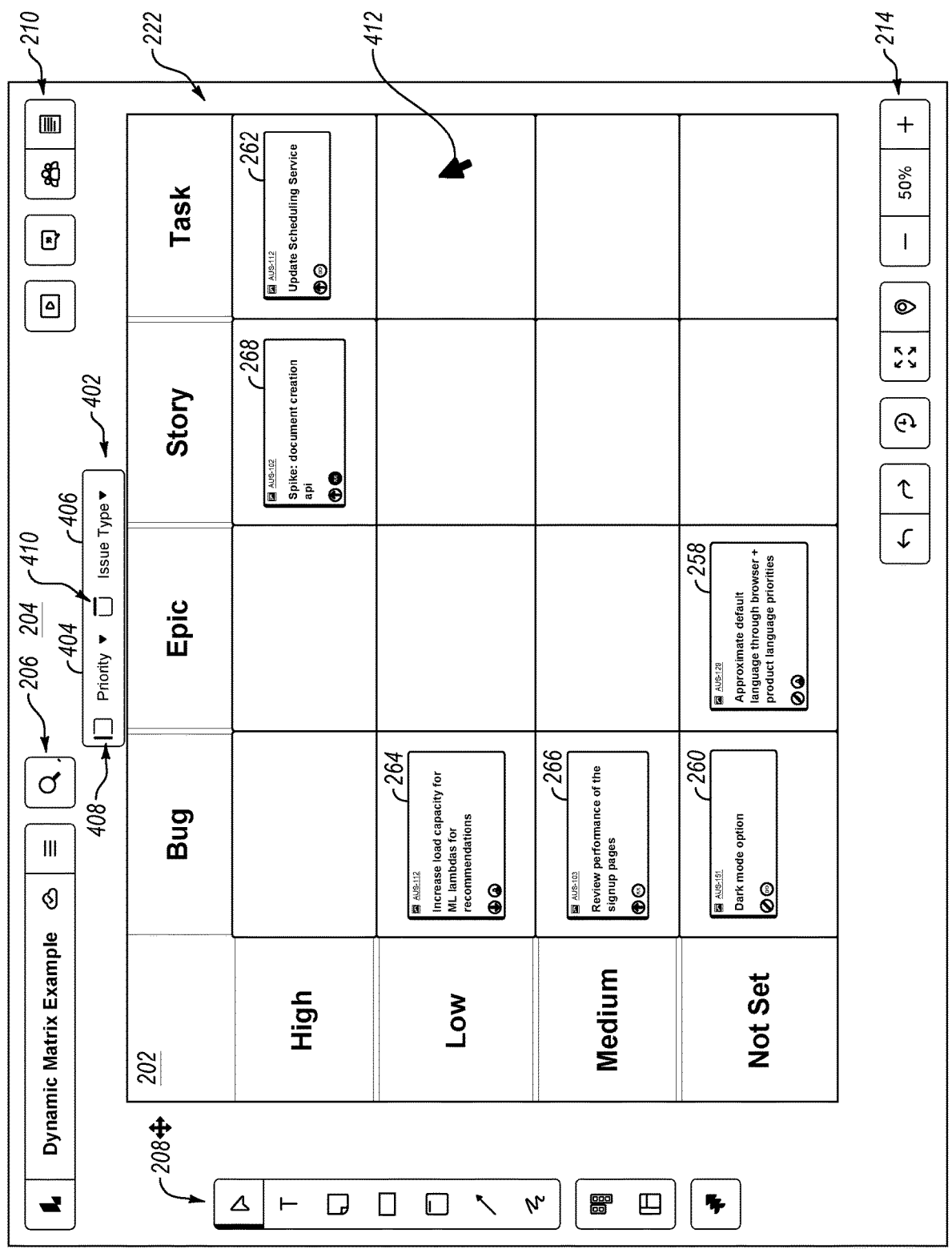

FIG. 4E shows an example of the graphical matrix 202 if the Issue Type attribute is assigned to the horizontal axis while the Priority attribute remains assigned to the vertical axis of the graphical matrix 202. With combined reference to FIGS. 4D and 4E, the graphical matrix 202 may be rearranged when the attribute assigned to an axis (the horizontal axis in this example) is changed. For example, a number of columns (or rows) may be changed if the number of possible values of the attribute newly assigned to the horizontal (or vertical) axis of the graphical matrix 202 is different than the number of values of the attribute previously assigned to the axis and/or the labels for each of the columns (or rows) may be changed to include or correspond to the values of the attribute newly assigned to the axis. In this example, since the Issue Type attribute has four possible values (Bug, Epic, Story, and Task) as may be determined from the attribute schemas of FIG. 3 and the Assignee attribute has only three, the graphical matrix 202 in FIG. 4E is rearranged compared to FIG. 4D to include four columns with new labels corresponding to the possible values of the Issue Type attribute.

In addition, after or simultaneous with rearranging the graphical matrix 202, the graphical objects 258, 260, 262, 264, 266, 268 may be rearranged within the rows and columns of the rearranged graphical matrix 202 according to respective values of the attribute newly assigned to the axis. For example, with combined reference to FIGS. 3 and 4E, it can be seen from the attribute schemas 308, 304, 312 of FIG. 3 that the graphical objects 264, 266, 260 representing the fourth, second, and sixth JIRA tickets discussed with respect to FIG. 3 each has a value of Bug for the Issue Type attribute 314A and is therefore arranged in the Bug column of the rearranged graphical matrix 202 in FIG. 4E. All of the graphical objects 258, 260, 262, 264, 266, 268 are similarly rearranged in the appropriate row and column of the rearranged graphical matrix 202 of FIG. 4E according to their respective values for the Priority attribute 314I and the Issue Type attribute 314A.

Figure 4F:
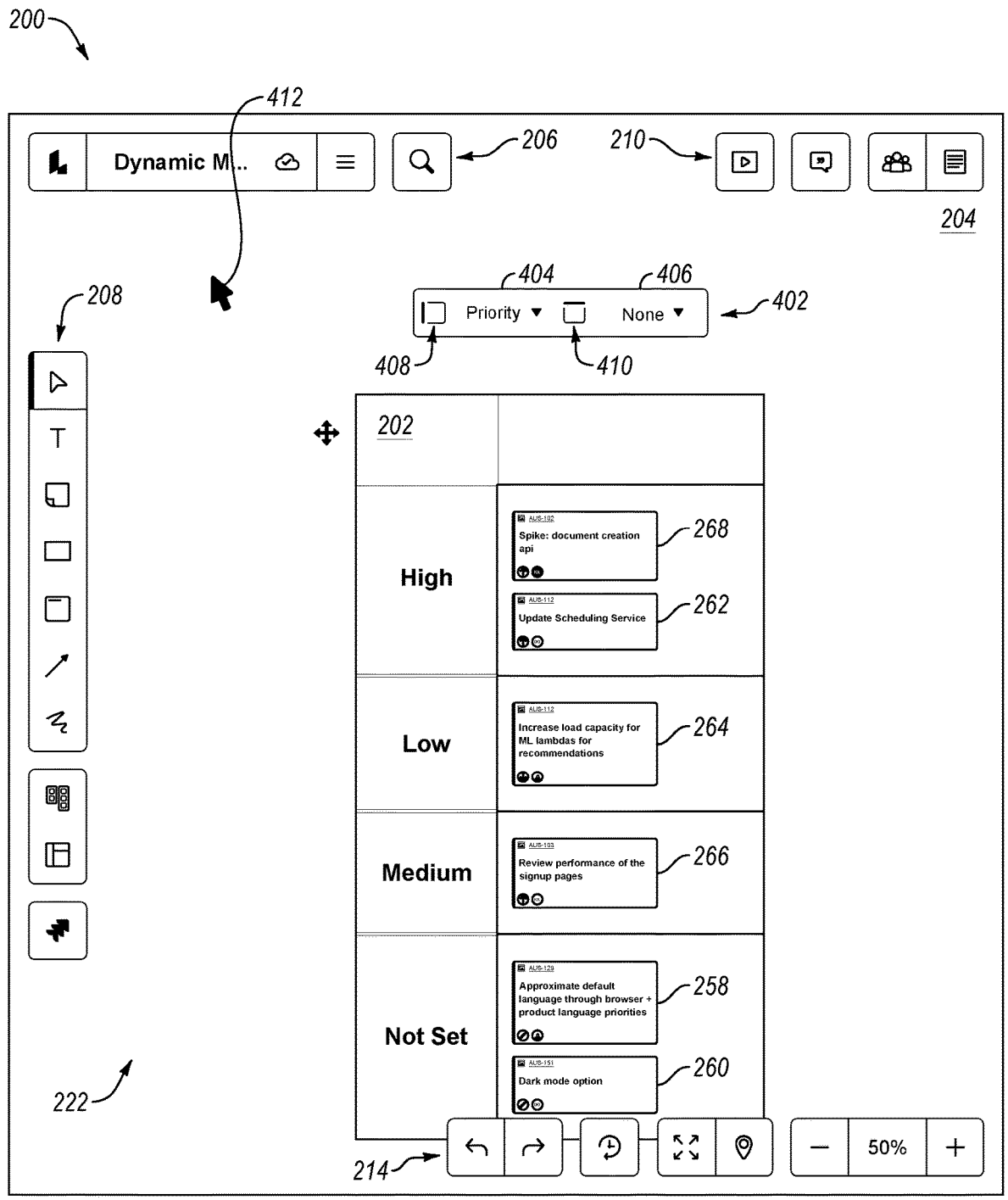

Some embodiments permit deleting or removing the attribute assignment from one or both of the axes of the graphical matrix 202 to collapse the graphical matrix 202 into a single row, a single column, or a single cell. For example, as illustrated in each of FIGS. 4B and 4D, each of the expanded vertical axis drop down menu 404 and horizontal axis drop down menu 406 may include a "None" option. Selection of the "None" option from either of the drop down menus 404, 406 may remove the assigned attribute from the corresponding axis without assigning another attribute to the corresponding axis. Consider, for example, the arrangement of the graphical matrix 202 in FIG. 4D where the "None" option is selected form the horizontal axis drop down menu 406 rather than the "Issue Type" attribute. In this example, all of the columns may collapse down to a single column as illustrated in FIG. 4F. All of the graphical objects 258, 260, 262, 264, 266, 268 may be arranged within the graphical matrix 202 of FIG. 4F according to their respective value for the attribute assigned to the vertical axis, e.g., the Priority attribute in this example. Since no attribute is assigned to the horizontal axis of the graphical matrix 202 in FIG. 4F, all of the graphical objects 258, 260, 262, 264, 266, 268 may be arranged within the same column in FIG. 4F. The single column in FIG. 4F may be unlabeled since it does not correspond to or represent any value of any attribute. Multiples rows and/or columns may alternatively or additionally be collapsed to a single row and/or column if all graphical objects have the same value for the attribute assigned to the vertical axis and/or the horizontal axis.

Figure 5A:
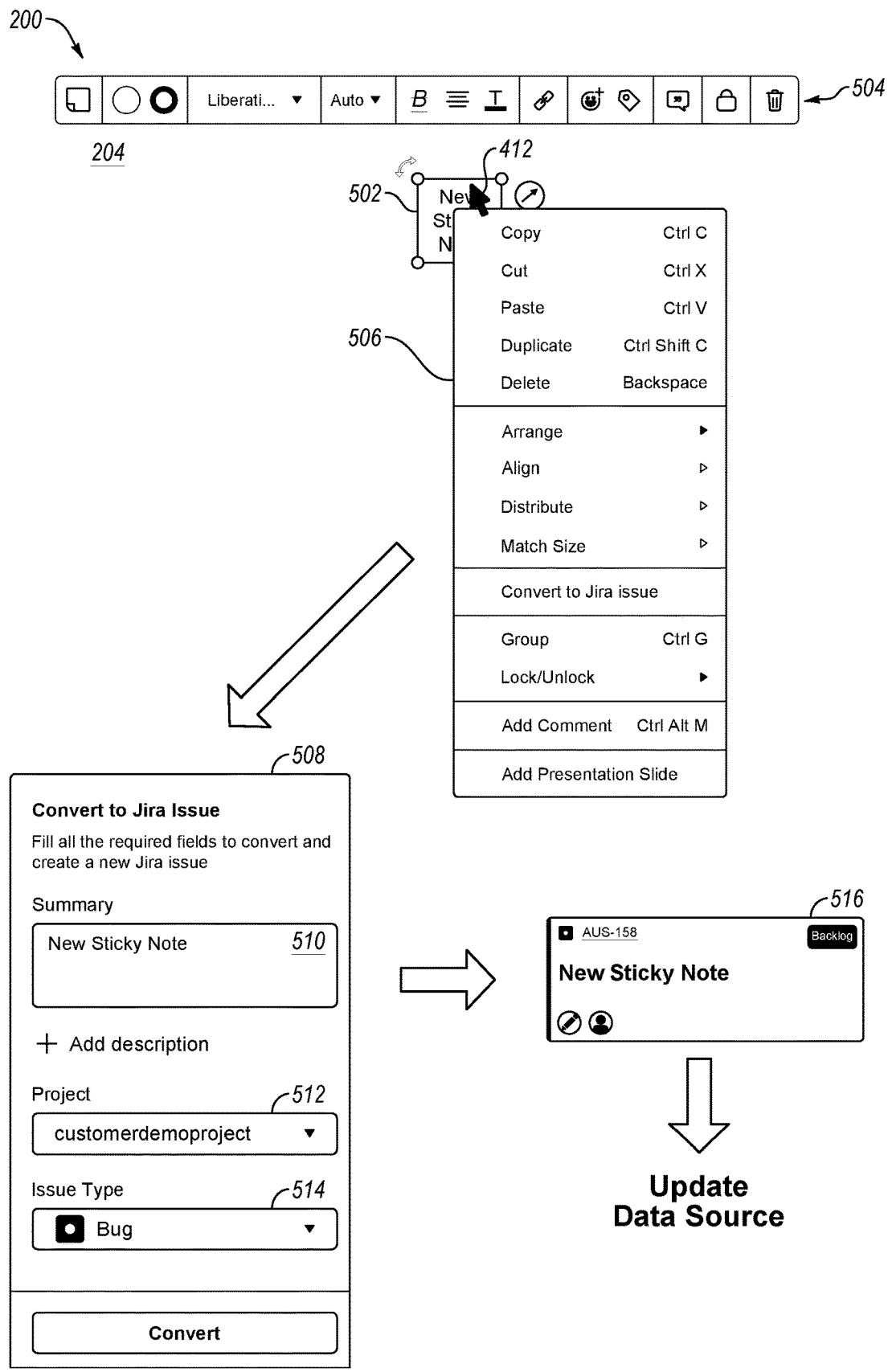
FIG. 5A includes the graphical representation of the UI of FIG. 2 that may also be used to convert a sticky note or other simple graphical object to a data-backed graphical object.
Figure 5B:
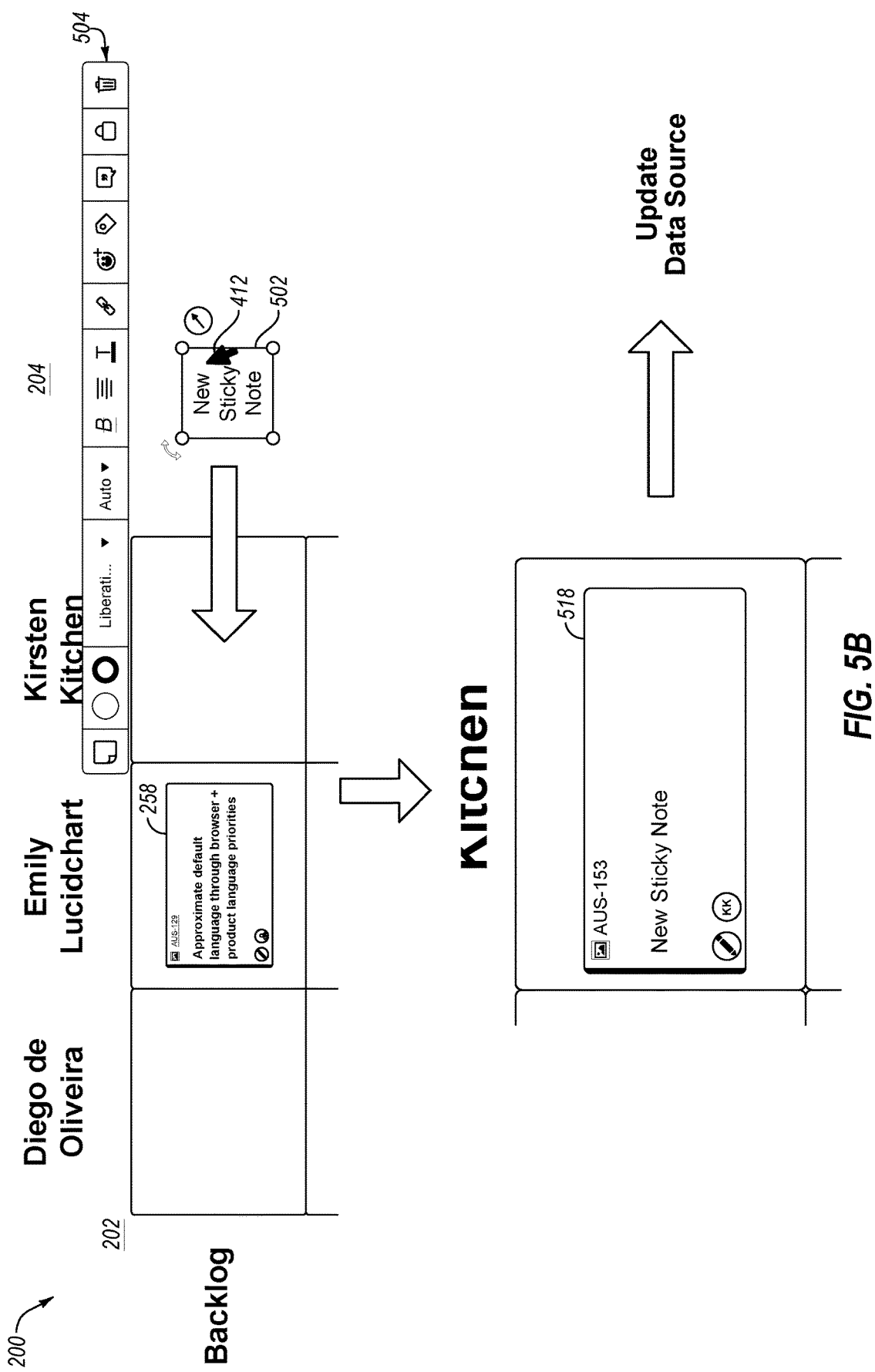
FIG. 5B includes the graphical representation of the UI of FIG. 2 that may also be used to convert the sticky note of FIG. 5A or other simple graphical object to a data-backed graphical object by dragging it into the graphical matrix of FIG. 2 or other data-backed container.

As previously indicated, graphical objects may be converted from simple graphical objects to data-backed graphical objects, e.g., by a user manually dragging a simple graphical object into a data-backed container or providing other appropriate input. Referring to FIG. 2, for instance, a simple graphical object such as a sticky note may be converted to a data-backed graphical object by dragging and dropping the simple graphical object into a data-backed container such as a graphical matrix. FIGS. 5A and 5B illustrate two examples of how to convert a simple graphical object to a data-backed graphical object.

FIG. 5A includes the graphical representation 200 of the UI of FIG. 2 that may also be used to convert a sticky note 502 or other simple graphical object to a data-backed graphical object, arranged in accordance with at least one embodiment described herein. The UI may be the same as, similar to, or different from any of the other UIs described herein.

The graphical representation 200 of FIG. 5A includes the canvas 204 and a contextual formatting menu bar 504. The contextual formatting menu bar 504 may be displayed when the sticky note 502 or other graphical object is generated and/or while it is selected, e.g., for editing, and may disappear when the sticky note 502 is not selected. The contextual formatting menu bar 504 may have on or more of the same or similar buttons as the contextual formatting menu bar 212 and/or may have one or more other or different buttons.

In some embodiments, a menu (such as a popup menu) 506 with an option to convert the sticky note 502 to a data-backed graphical object may be accessed by a right mouse click when the mouse cursor 412 is on the sticky note 502, or through other appropriate input. The option to convert the sticky note 502 to the data-backed graphical object may be listed in the menu 506, e.g., as "Convert to Jira issue" in this example. Options to convert to other types of data-backed graphical objects may be listed as options in the menu 506 and/or may be accessed in other manners.

In response to receiving input to convert the sticky note 502 to a data-backed graphical object, an attribute schema for the sticky note 502 may be generated and/or stored. For example, an attribute schema for the sticky note 502 may be generated and/or stored in the structured source data 116 of FIG. 1 and/or the structured source data 300 of FIG. 3. The attribute schema of the sticky note 502 may be empty (e.g., no values for any of the attributes) and/or may be automatically populated with one or more inferred values for one or more of the attributes of the attribute schema. For example, if the sticky note 502 is in a collaboration space with other data-backed graphical objects that represent JIRA tickets or other data objects that share one or more common values for one or more attributes, the attribute schema of the sticky note 502 may be automatically populated with one or more of the common values.

Alternatively or additionally, a conversion menu 508 may be displayed, e.g., in response to the user's selection of the option to convert the sticky note 502 to the data-backed graphical object. The conversion menu 508 may request one or more values for one or more attributes from the user. For example, the conversion menu 508 illustrated in FIG. 5A specifically requests values for Summary, Project, and Issue Type attributes of the sticky note 502 in a Summary field 510, a Project drop down menu 512, and an Issue Type drop down menu 514. The conversion menu 508 is pre-populated in the example of FIG. 5A with a value of "New Sticky Note" (e.g., the original text of the sticky note 502) for the Summary attribute, a value of "customerdemoproject" (e.g., a default Project attribute value and/or the Project attribute value of other graphical objects in the same collaboration space or near the sticky note 502) for the Project attribute, and a value of "Bug" (e.g., a default Issue Type attribute and/or the Issue Type attribute value of other graphical objects in the same collaboration space or near the sticky note 502) for the Issue Type attribute.

After inferring and/or collecting one or more values for one or more of the attributes in the attribute schema of the sticky note 502, the sticky note 502 may be converted to a data-backed graphical object 516 having the inferred and/or collected values. The data-backed graphical object 516 in the example of FIG. 5A represents a JIRA ticket, similar to the graphical objects 258, 260, 262, 264, 266, 268 discussed herein. As described in more detail below, a JIRA SERVICE MANAGEMENT data source may be updated to include the JIRA ticket represented by the data-backed graphical object 516. More generally, a corresponding data source may be updated to include a corresponding data object represented by any data-backed graphical object generated from a simple data object as described herein, as generally indicated in FIG. 5A.

FIG. 5B includes the graphical representation 200 of the UI of FIG. 2 that may also be used to convert the sticky note 502 or other simple graphical object to a data-backed graphical object by dragging it into the graphical matrix 202 or other data-backed container. The UI may be the same as, similar to, or different from any of the other UIs described herein.

In the example of FIG. 5B, the sticky note 502 may be dragged and dropped form the position illustrated in FIG. 5B to one of the cells of the graphical matrix 202, and specifically the cell at the intersection of the Backlog row and the Kirsten Kitchen column in the illustrated embodiment. In response to the sticky note 502 being dropped in the graphical matrix 202, an attribute schema for the sticky note 502 may be generated and/or stored. For example, an attribute schema for the sticky note 502 may be generated and/or stored in the structured source data 116 of FIG. 1 and/or the structured source data 300 of FIG. 3. The attribute schema of the sticky note 502 may be empty (e.g., no values for any of the attributes) and/or may be automatically populated with one or more inferred values for one or more of the attributes of the attribute schema. For example, if the sticky note 502 is dropped in a particular cell of a graphical matrix, values corresponding to the row and column of the cell may be inferred as values for the attributes assigned to, respectively, the vertical and horizontal axes of the graphical matrix. In this particular embodiment, if the sticky note 502 is dropped in the cell at the intersection of the Backlog row and the Kirsten Kitchen column, a value of Backlog may be saved as the Status attribute of the sticky note 502 and a value of Kirsten Kitchen may be saved as the Assignee attribute of the sticky note 502. Values of these or other attributes of the sticky note 502 may alternatively or additionally be inferred or collected in the same, similar, or different manners as described with respect to FIG. 5A.

After inferring and/or collecting one or more values for one or more of the attributes in the attribute schema of the sticky note 502, the sticky note 502 may be converted to a data-backed graphical object 518 having the inferred and/or collected values. The data-backed graphical object 518 in the example of FIG. 5B represents a JIRA ticket, similar to the graphical objects 258, 260, 262, 264, 266, 268 discussed herein. As described in more detail below, a JIRA SERVICE MANAGEMENT data source may be updated to include the JIRA ticket represented by the data-backed graphical object 518. More generally, a corresponding data source may be updated to include a corresponding data object represented by any data-backed graphical object generated from a simple data object as described herein, as generally indicated in FIG. 5B.

Figure 5C:
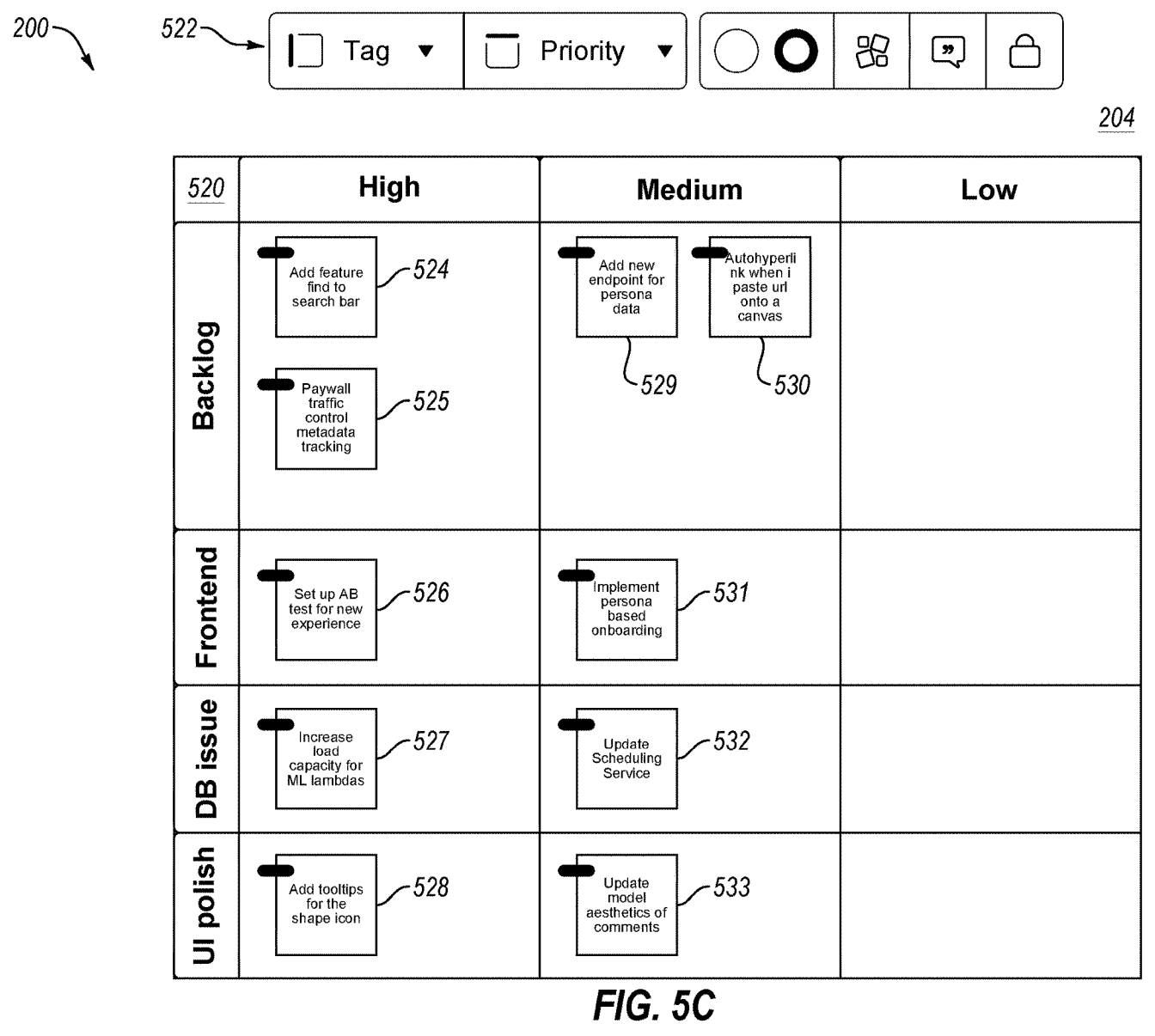
Figure 5D:
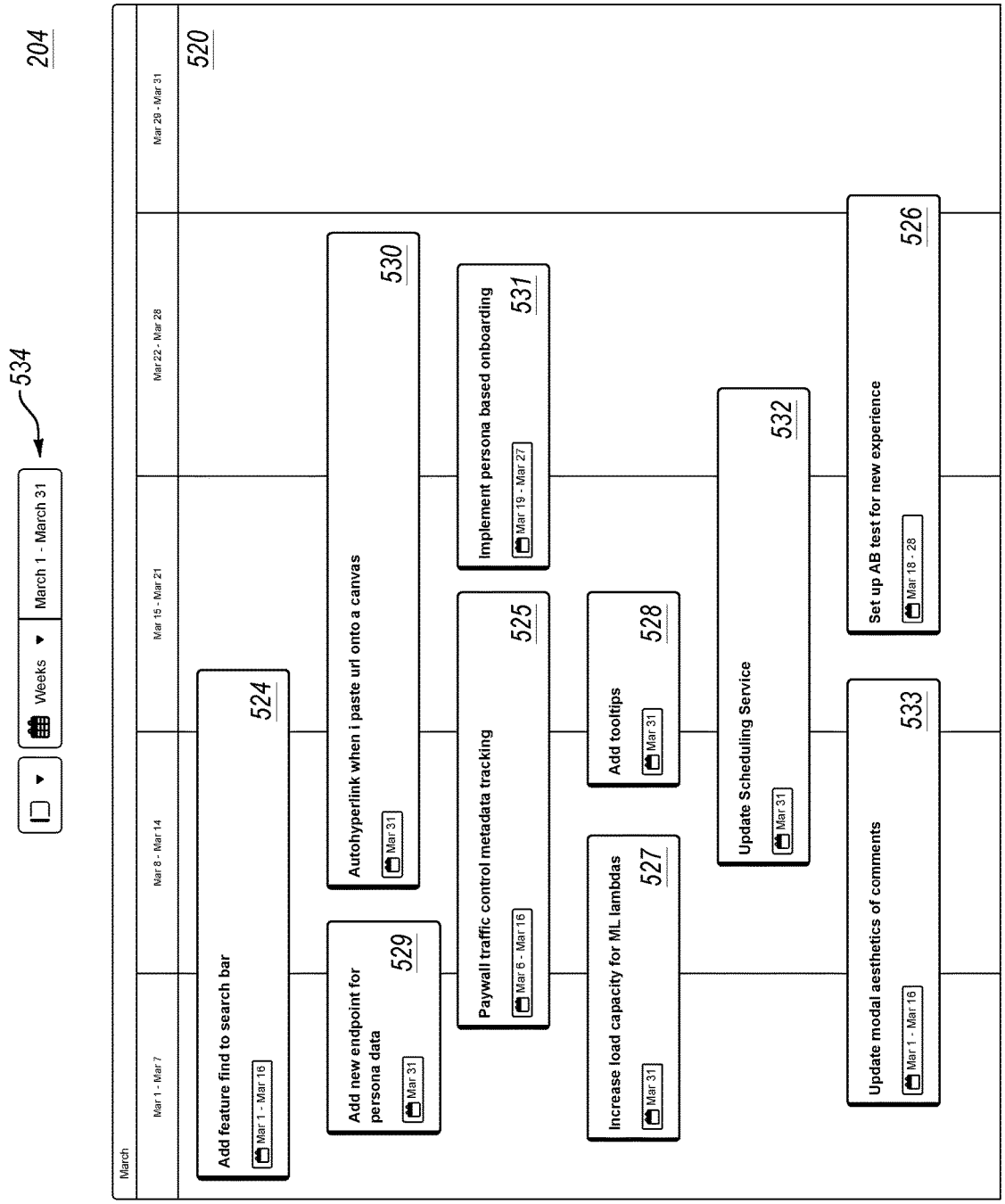

FIGS. 5C and 5D include the graphical representation 200 of the UI of FIG. 2 that may also be used to convert graphical objects to different types, arranged in accordance with at least one embodiment described herein. The UI may be the same as, similar to, or different from any of the other UIs described herein.

In the example of FIGS. 5C and 5D, a graphical container 520 may be changed from one type to another. For example, a user may provide a right mouse click input on the graphical container 520 in FIG. 5C or 5D to open a menu, such as a popup menu, with an option to change the graphical container 520 from one type to another.

The graphical container 520 is illustrated in FIG. 5C as a graphical matrix with a Tag attribute assigned to the vertical axis and a Priority attribute assigned to the horizontal axis, as indicated in attribute assignment bar 522. Various graphical objects 524-533 are arranged within the graphical container 520 of FIG. 5C according to their respective values for the Tag and Priority attributes.

The graphical container 520 is illustrated in FIG. 5D as a timeline container with a timeline granularity selected from a timeline configuration bar 534. In the example of FIG. 5D, the timeline granularity is weeks for a period March 1 to March 31, each week of the time period covered by a vertical column with a corresponding header in the graphical container 520. The graphical objects 524-533 may have values for a Start Date attribute and a Due Date attribute in their attribute schemas. Accordingly, the graphical objects 524-533 may be arranged spanning the weeks of the time period March 1 to March 31 depending on values of their Start Date and Due Date attributes. For example, the graphical object 524 may have values of March 1 and March 17 for the Start Date and Due Data attributes and is therefore depicted in FIG. 5D as starting at the beginning of the week "March 1-March 7" and ending partially into the week "March 15-March 21".

The graphical objects 524-533 are depicted in FIG. 5C as sticky notes, e.g., each having a value of sticky note for a Shape Type attribute and a corresponding shape within the graphical matrix of FIG. 5C. The graphical objects 524-533 are depicted in FIG. 5D as timeline cards, e.g., each having a value of timeline card in their attribute schemas for the Shape Type attribute and a corresponding shape within the timeline container of FIG. 5D. When the graphical container 520 is changed from the graphical matrix of FIG. 5C to the timeline container of FIG. 5D, the graphical objects 524-533 may automatically change from sticky notes to timeline cards. Conversely, when the graphical container 520 is changed from the timeline container of FIG. 5D to the graphical matrix of FIG. 5C, the graphical objects 524-533 may automatically change from timeline cards to sticky notes. When the shape of a graphical object is changed, the value of the shape type attribute in the attribute schema of the graphical object and its shape as displayed on the canvas 204 may be updated to reflect the change.

In some embodiments, possible values of one or more of the attributes may span a continuum. For example, attributes that include or involve a timeline, numbering system, cost system, or the like may span a continuum of time values, number values, cost values, or the like. In these and other embodiments, the continuum may include and/or may be divided, binned, or bucketed into multiple sequential and/or non-overlapping value ranges, each corresponding to a different row along the vertical axis of the corresponding graphical matrix if the corresponding attribute is assigned to the vertical axis or a different column along the horizontal axis of the corresponding graphical matrix if the corresponding attribute is assigned to the horizontal axis. For example, if the attribute assigned to the horizontal axis of a graphical matrix is due date, each column in the graphical matrix may correspond to a different range of time values (dates in this example) such as different days, different weeks, different months, different years, or the like. In some embodiments, the user may provide input to define the value range for each row or column individually. In some embodiments, the user may provide input to define a common size of all value ranges for all rows or columns and the value range for each row or column may be automatically defined based on, e.g., the defined common size. Alternatively or additionally, the user may provide input to change or set granularity along an axis assigned to an attribute that spans a continuum and/or to expand or collapse rows or columns along a corresponding axis by increasing or decreasing the granularity.

Figure 6A:
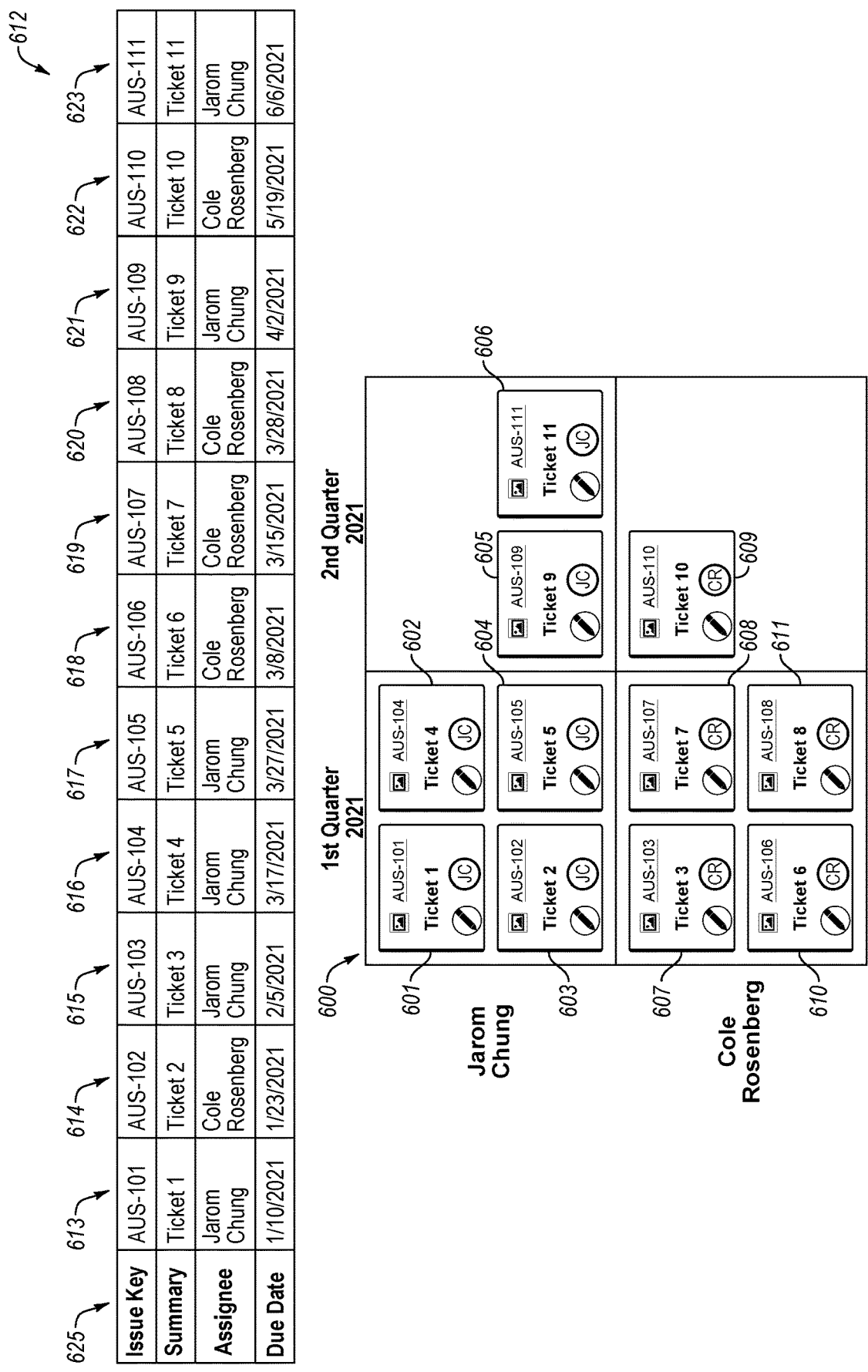
FIGS. 6A-6C illustrate an example graphical matrix in which possible values of an attribute assigned to one if its axes span a continuum.
Figure 6B:
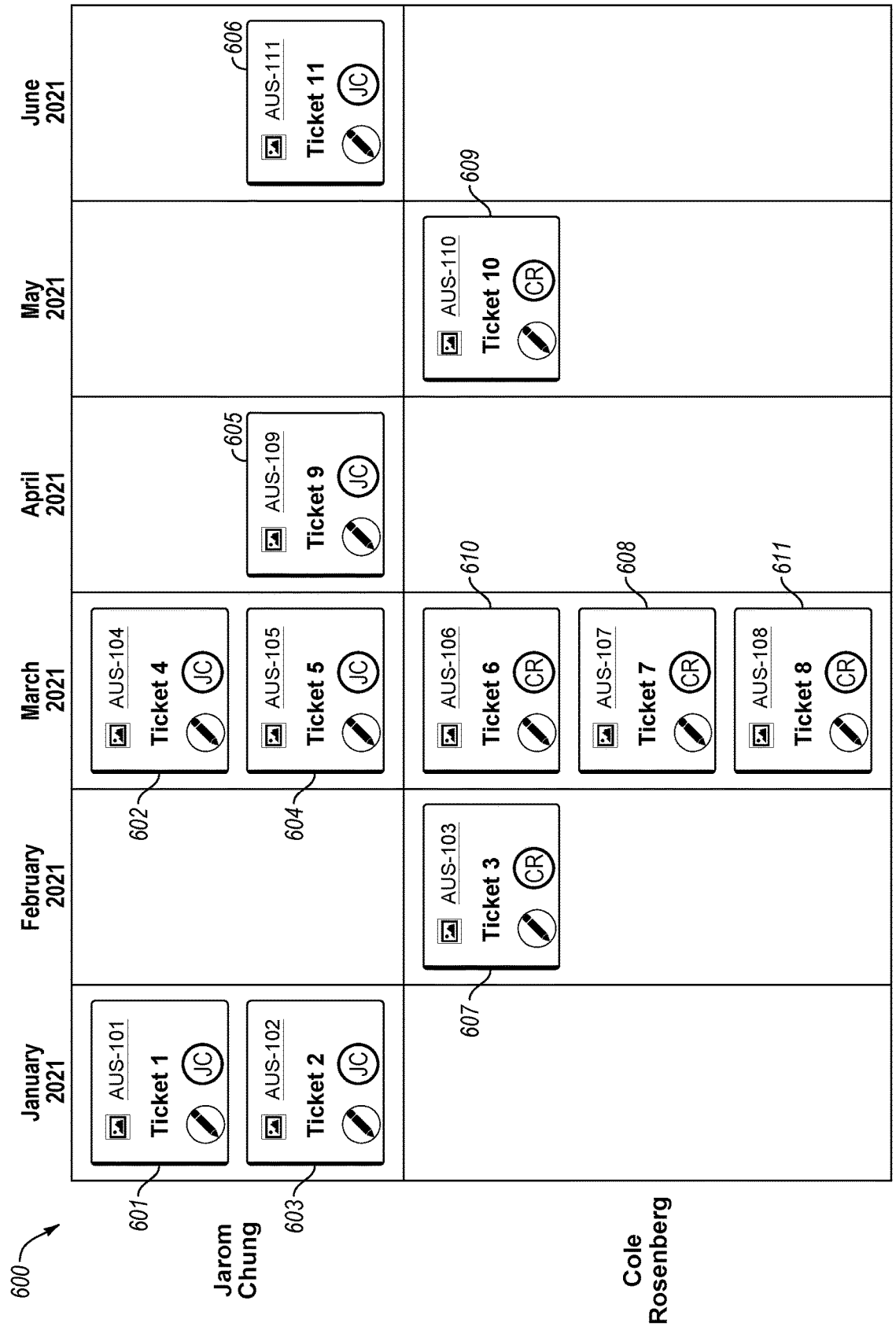
Figure 6C:
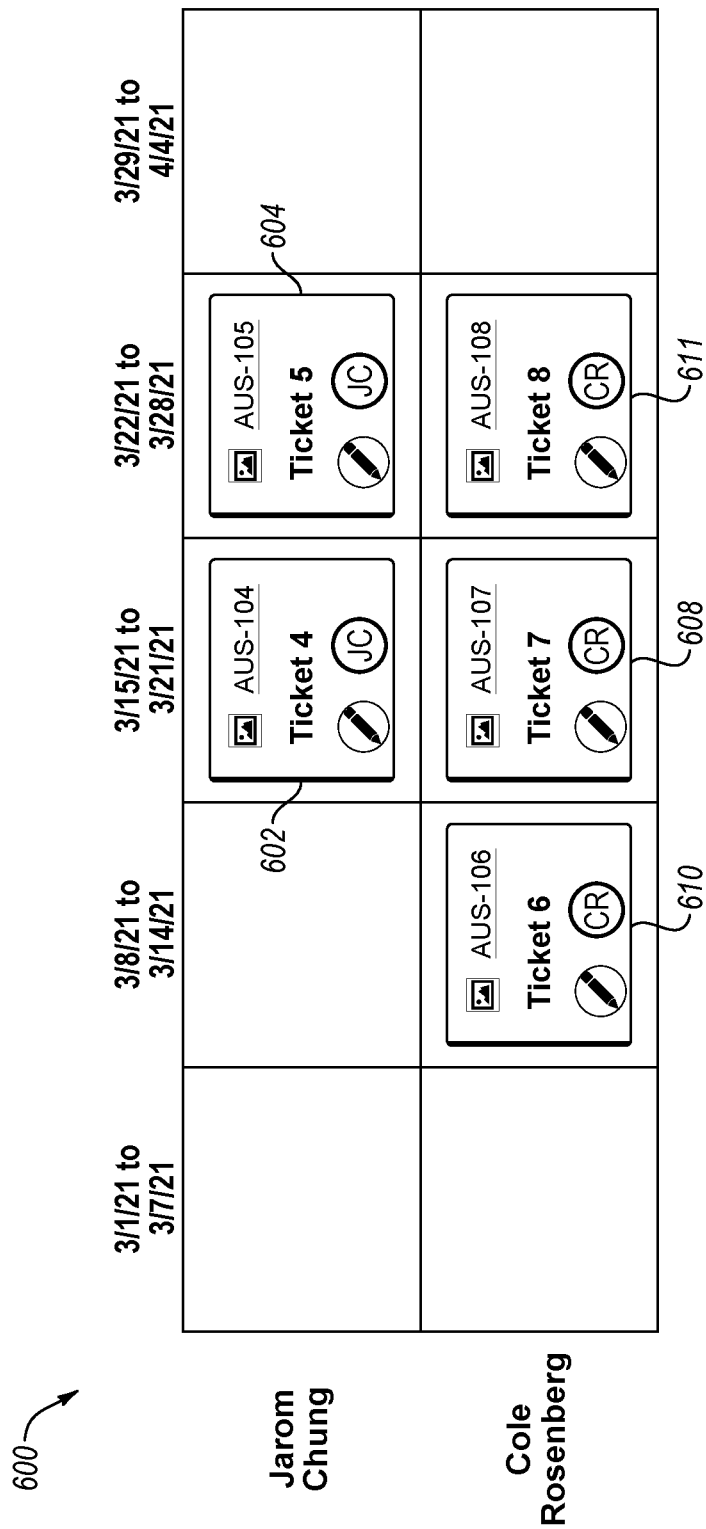

In connection with the foregoing, FIGS. 6A-6C illustrate an example graphical matrix 600 in which possible values of an attribute assigned to one if its axes span a continuum, arranged in accordance with at least one embodiment described herein. In particular, the attribute assigned to the horizontal axis is a Due Date attribute with possible values that span a continuum of days, in this example, from Jan. 1, 2021 to Jun. 30, 2021. The possible values could be more granular, e.g., a continuum of hours, minutes, seconds, or the like, or less granular, e.g., a continuum of weeks, months, quarters, years, or the like. An Assignee attribute is assigned to the vertical axis. In this example, each of the graphical objects 601-611 represents a different JIRA ticket or other data object in structured source data of a JIRA SERVICE MANAGEMENT data source or other data source.

The graphical matrix 600 includes multiple graphical objects 601-611 arranged in rows and columns of the graphical matrix 600 according to respective values of their Due Date and Assignee attributes. For example, all graphical objects 601-606 with a value of Jarom Chung for their Assignee attribute are arranged in the Jarom Chung row of the graphical matrix 600 while all graphical objects 607-611 with a value of Cole Rosenberg for their Assignee attribute are arranged in the Cole Rosenberg row of the graphical matrix 600.

FIG. 6A further illustrates example structured source data 612 of the JIRA tickets represented by the graphical objects 601-611. The structured source data 612 includes attribute schemas 613-623 for all of the JIRA tickets, each of the attribute schemas 613-623 including values for attributes 625. The attribute schemas 613-623 are shown in simplified form for illustration purposes.

As previously indicated, in some embodiments, the value range of rows or columns having an assigned attribute with possible values that span a continuum may be set or defined by a user and/or automatically. In the example of FIG. 6A, the value range of each column is one quarter, e.g., approximately 90 days. In the example of FIG. 6B, the value range of each column is one month, e.g., 28-31 days depending on the month. In the example of FIG. 6C, which shows only a portion of the graphical matrix 600, the value range of each column is one week, e.g., 7 days. When the Due Date attribute (or other attribute whose possible values span a continuum) is assigned to the horizontal axis (or other axis), the value range of each column (or row) may be default value range. Alternatively or additionally, a popup menu or other UI may be presented to the user in response to appropriate input (e.g., in response to the user providing a right mouse click input when the mouse cursor is over one or more of the column labels along the horizontal axis) to permit the user to set or define the value range of each column (or row) individually or as a group. For example, the user may set or define unique ranges for each column (or row) by entering a start and end value for each column (or row) individually or the user may set or define a common range for all columns (or rows) by entering a common size or length (e.g., year, quarter, month, week, day, or user-defined range) to be applied to each column (or row).

In another example, a user may expand or one or multiple rows or columns of the graphical matrix 600 to increase granularity and/or may collapse two or more rows or columns into fewer rows or columns to decrease granularity. Options to expand or contract rows or columns may be presented in a UI to the user, e.g., in response to the user selecting one or more rows or columns and providing a right mouse click input. For example, referring to FIGS. 6B and 6C, suppose the user desires more granularity for the month of March 2021. The user may select the month of March 2021 in the graphical matrix 600, provide a right mouse click input, and select an option to expand the March 2021 column into multiple sub-columns, e.g., of a week each. In response, the graphical matrix 600 may expand the March 2021 column of FIG. 6B into multiple sub-columns, e.g., of a week each, such as illustrated in FIG. 6C. Alternatively or additionally, and referring to FIGS. 6A and 6B, suppose the user desires less granularity for the months January-June 2021 or for January-March 2021 or for April-June 2021. The user may provide input to collapse the individual month columns down to corresponding quarter columns. For example, the January 2021 column, February 2021 column, and March 2021 column of FIG. 6B may be collectively collapsed to the 1st Quarter 2021 column of FIG. 6A and/or the April 2021 column, May 2021 column, and June 2021 column of FIG. 6B may be collectively collapsed to the 2nd Quarter 2021 column of FIG. 6A.

In FIGS. 2, 4A-4F, and 6A-6C, the various graphical objects shown within graphical matrices 202, 600 represent JIRA tickets, and may be referred to as JIRA graphical objects. The collaboration application 114 may use particular shapes and/or formats to visually differentiate particular types of graphical objects. For instance, one shape and/or format may be used for JIRA graphical objects (e.g., graphical objects that represent JIRA tickets or other JIRA data objects), another shape and/or format may be used for sticky notes, another shape and/or format may be used for ZENDESK graphical objects (e.g., graphical objects that represent ZENDESK tickets or other ZENDESK data objects), and so on. In some embodiments, data-backed containers, such as graphical matrices 202, 600, may be associated with a particular type of data source (e.g., JIRA SERVICE MANAGEMENT or ZENDESK) and all graphical objects in the data-backed container may be of the same type (e.g., JIRA graphical object or ZENDESK graphical object) associated with the type of data source. Alternatively or additionally, a graphical object may be converted from one type to another, e.g., as described with respect to FIGS. 5A and/or 5B. In some embodiments, data-backed containers may be changeable from one type to another. In these and other embodiments, changing a data-backed container from a first type of data-backed container (e.g., a graphical matrix for JIRA graphical objects, referred to as a JIRA graphical matrix) to a second type of data-backed container (e.g., a graphical matrix for ZENDESK graphical objects, referred to as a ZENDESK graphical matrix) may automatically change all graphical objects within the data-backed container from one type (e.g., JIRA graphical object) corresponding to the first type of data-backed container to another type (e.g., ZENDESK graphical object) corresponding to the second type of data-backed container.

In some embodiments, structured source data of a graphical matrix or a portion thereof may be displayed in or near a collaboration space in which the graphical matrix is displayed. For example, some or all of the structured source data 300, 612 of FIGS. 3 and 6A of the graphical matrix 202, 600 may be displayed in the corresponding collaboration space (e.g., collaboration space 222) or in a panel of a browser within which the collaboration space is provided. The structured source data may be displayed anytime the corresponding graphical matrix is selected, in response to user input requesting that it be displayed, at other times, and/or in response to other input(s).

In some embodiments, one or more of the values within the structured source data displayed to the user may be changed, e.g., by the user, which changes may be reflected in the graphical objects and/or the graphical matrix. In these and other embodiments, the corresponding graphical objects in the corresponding graphical matrix may be rearranged within the graphical matrix consistent with the change to the values within the structured source data, if warranted. For instance, if a first attribute is assigned to one of the axes of the graphical matrix and the value of the first attribute for a first graphical object within the graphical matrix is changed in the structured source data from a first value to a second value, the first graphical object may be rearranged from within a first column or row corresponding to the first value for the first attribute to a second column or row corresponding to the second value for the first attribute. The rearrangement of the graphical objects within the graphical matrix may occur automatically in response to changes to values in the structured source data, at predefined intervals, in response to predefined inputs (e.g., in response to refreshing the collaboration space or in response to use authorization), or the like.

In some embodiments, one or more of the values of attributes of the graphical objects may be changed, e.g., by the user, directly at the graphical object and/or from an interface other than the displayed structured source data, which changes may be reflected in the structured source data displayed to the user. For example, if a user drags a graphical object from one cell of the graphical matrix associated with a first value for a first attribute and a second value for a second attribute to another cell of the graphical matrix associated with a different third value for the first attribute and/or fourth value for the second attribute, the values of the first and/or second attributes for the graphical object may be updated accordingly in the structured source data.

In some embodiments, attributes of graphical objects may at any given time have a single value. In some embodiments, attributes of graphical objects may simultaneously have multiple values. For example, a Reaction or Emoji attribute of a graphical object may be capable of simultaneously having multiple values (e.g., multiple different emojis, potentially provided by different users). If an attribute that is capable of simultaneously having multiple values for a given attribute is assigned to an axis of a graphical matrix and a graphical object has multiple values for the given attribute, the graphical object may be replicated within the graphical matrix to appear in each column or row that corresponds to any of the values the graphical object has for the attribute. For example, if an Emoji attribute is assigned to a horizontal axis, a graphical object has values of smiley emoji and laughing emoji, and the graphical matrix has different columns for the smiley and laughing emojis, the graphical object may be replicated so that it may be displayed in both the smiley emoji column and the laughing emoji column of the graphical matrix. Alternatively or additionally, a collaboration space may include multiple different graphical matrices, data-backed containers, or other visualizations to which a graphical object belongs. The graphical object may be replicated across all graphical matrices, data-backed containers, or other visualizations within the collaboration space to which it belongs. In these and other embodiments, the graphical object and its replicate (or replicates if there are more than one), whether in the same graphical matrix, data-backed container, or visualization or different graphical matrix, data-backed container, or visualization, may be linked so that changes made to one, e.g., by a user, may be automatically made to the other(s).

In some embodiments, graphical matrices and/or graphical objects within graphical matrices may be filtered to limit the content displayed in the graphical matrix. FIG. 7A illustrates an example UI to filter graphical objects within a graphical matrix, arranged in accordance with at least one embodiment described herein. The UI includes a contextual formatting menu bar 700 such as may be displayed when a graphical matrix, such as the graphical matrix 202 of FIG. 2, is selected. The contextual formatting menu bar 700 includes many of the same buttons as the contextual formatting menu bar 212 of FIG. 2, including the fill color button 244, the outline color button 246, the linking button 248, the tagging button 250, the comment button 252, the lock button 254, and the delete button 256.

The contextual formatting menu bar 700 additionally includes a filter button 702. In response to selection of the filter button 702, e.g., by a user providing a right mouse click input on the filter button 702, a filter menu 704 (such as a popup menu) may be displayed to the user. The filter menu 704 may include various filters to filter graphical objects within the graphical matrix. For example, the filter menu 704 may include one or more of a keyword filter 706 and one or more attribute filters, such as a Priority attribute filter 708, a Project attribute filter 710, a Status attribute filter 712, an Assignee attribute filter 714, and a Reporter attribute filter 716. In general, after a user sets one or more filter parameters in the filter menu 704 and selects an "Apply Filters" button (or provides other suitable input), the graphical objects within the graphical matrix may be filtered according to the filter parameters. For example, all graphical objects that satisfy the filter parameters may remain displayed while all graphical objects that fail to satisfy the filter parameters may be hidden.

The keyword filter 706 may be used by entering a word, term, phrase, or other text or number string into a keyword field 718, hereinafter referred to as the "keyword". In some embodiments, the keyword filter 706 may include a toggle button 720 that can be toggled between two values, e.g., "Include" or "Exclude", to configure the keyword filter 706 to look for graphical objects that include (in the case of "Include") or exclude (in the case of "Exclude") the keyword. The keyword filter 706 may search for the keyword in one or more of the values included in attribute schemas for the graphical objects and may return each graphical object that includes or excludes, as the case may be, the keyword in or as the one or more of the values of the corresponding attribute schema.

In the illustrated embodiment, each of the attribute filters 708, 710, 712, 714, 716 includes a drop down menu from which a user can select one or more values for the corresponding attribute that the user desires to filter on. The possible values for each of the attributes may be taken or determined from the attribute schemas of the graphical objects in the graphical matrix. For example, with combined reference to FIGS. 2, 3, and 7, if the user selects values of Backlog and In Progress from the Status attribute filter 712, the graphical objects 258, 262, 264, 266, and 268 that have a value of Backlog or In Progress for the Status attribute and thus satisfy the Status attribute filter parameter may remain displayed in the graphical matrix 202 after the filter is applied, while the graphical object 260 that has a value of Done for the Status attribute and thus fails to satisfy the Status attribute filter parameter may be hidden after the filter is applied. In these and other embodiments, filtering may result in hiding graphical objects within entire rows or columns from view, in which case the empty rows or columns may also be hidden from view.

Figure 7B:
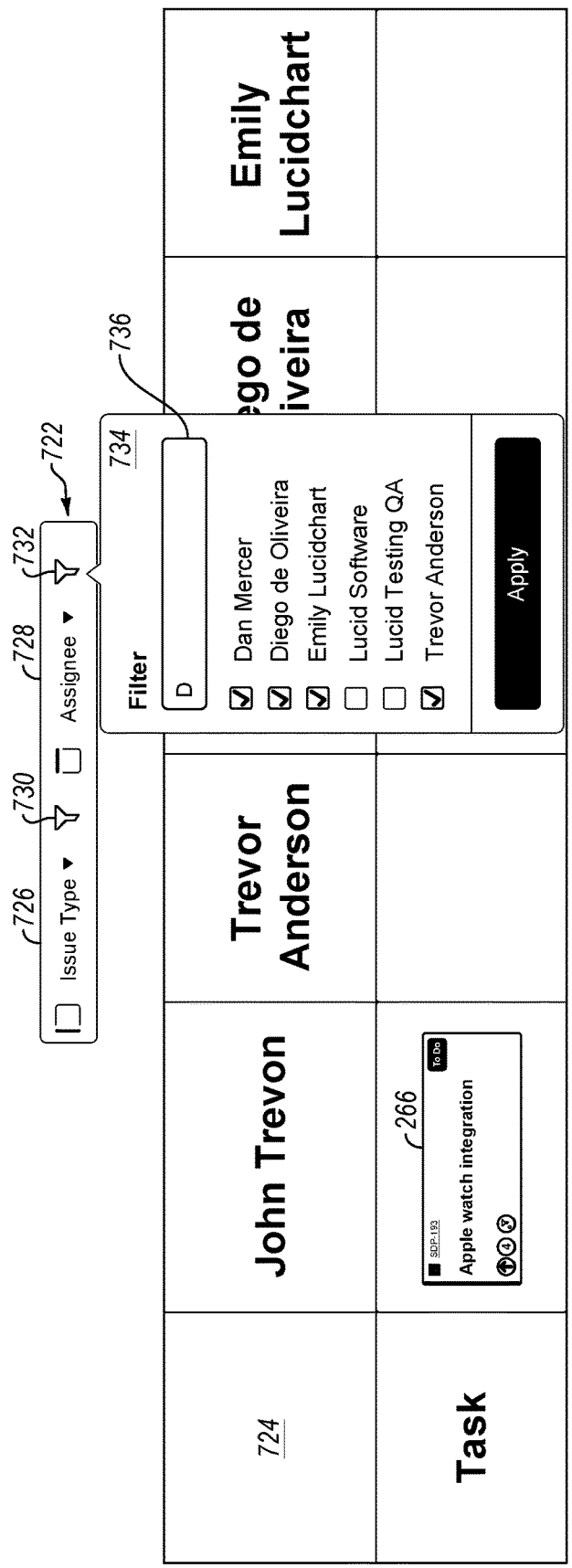
FIG. 7B illustrates an example UI to filter rows and columns within a graphical matrix.

FIG. 7A illustrates an example of filtering graphical objects within a graphical matrix. Alternatively or additionally, embodiments herein may permit filtering rows or columns of a graphical matrix. For example, FIG. 7B illustrates an example UI to filter rows and columns within a graphical matrix, arranged in accordance with at least one embodiment described herein. The UI includes an attribute assignment bar 722 such as may be displayed in response to appropriate input at a graphical matrix 724, similar to other attribute assignment bars described herein.

Similar to the attribute assignment bar 402 of FIG. 4A, the attribute assignment bar 722 may include a vertical axis drop down menu 726 and a horizontal axis drop down menu 728. As illustrated in FIG. 7B, the Issue Type attribute is currently assigned to the vertical axis of the graphical matrix 724 and the Assignee attribute is currently assigned to the horizontal axis of the graphical matrix 724. The attribute assignment bar 722 may additionally include a vertical axis filter button 730 and/or a horizontal axis filter button 732.

When a corresponding one of the axis filter buttons 730, 732 is selected, a list of values for the attribute currently assigned to the corresponding axis may be displayed, as indicated in FIG. 7B for the horizontal axis filter button 732. In particular, as illustrated in FIG. 7B, and in response to selection of the horizontal axis filter button 732, a list 734 of all values for the attribute assigned to the horizontal axis (e.g., Assignee in this example) may be displayed. A similar list of all values for the attribute assigned to the vertical axis (e.g., Issue Type in this example) may be displayed in response to selection of the vertical axis filter button 730.

When a checkbox next to a given value in the list 734 is checked, a column corresponding to the given value may be included in the graphical matrix 724. When the checkbox next to the given value in the list 734 is unchecked, the column corresponding to the given value may be excluded from the graphical matrix 724. Similarly, when a checkbox next to a given value in a list of values for the attribute assigned to the vertical axis is checked, a row corresponding to the given value may be included in the graphical matrix 724. When the checkbox next to the given value in the list of values for the attribute assigned to the vertical axis is unchecked, the row corresponding to the given value may be excluded from the graphical matrix 724.

When changes are made to the list 734 of values for the attribute assigned to the horizontal axis, e.g., when a checked box is unchecked and/or when an unchecked box is checked, followed by selection of an "Apply" button in the list 734 or other suitable input, the graphical matrix 724 may reconfigure itself to include a column for each newly checked value and to exclude a column for each newly unchecked value in the list 734. Similarly, when changes are made to the list of values for the attribute assigned to the vertical axis followed by selection of an "Apply" button in the list of values for the attribute assigned to the vertical axis or other suitable input, the graphical matrix 724 may reconfigure itself to include a row for each newly checked value and to exclude a row for each newly unchecked value in the list of values for the attribute assigned to the vertical axis. Accordingly, the horizontal axis filter button 732 or other suitable UI element(s) may be used to filter columns of the graphical matrix 724 while the vertical axis filter button 730 or other suitable UI element(s) may be used to filter rows of the graphical matrix 724.

In some embodiments, the list 734 may include a Keyword search field 736. Any text entered in the Keyword search field 736 may be searched in values of the attribute assigned to the horizontal axis. Those values that have the search text may be automatically checked, while those values that lack the search text may be automatically unchecked. Selection of the "Apply" button or other suitable button or input may reconfigure the graphical matrix 724 to include or exclude rows according to the checked/unchecked values in the list 734. The list of values for the attribute assigned to the vertical axis may similarly include a Keyword search field that may be used in the same or similar manner.

Some data sources have data objects with dependencies. For example, JIRA SERVICE MANAGEMENT permits issues to have incoming and outgoing dependencies. Embodiments herein may include dependencies as attributes in attribute schemas of graphical objects and may generate visualizations based on the values of the dependencies attributes. Examples of values for dependency attributes include depends on X, relates to X, is blocked by X, is a duplicate of X, and the like.

Figure 8A:
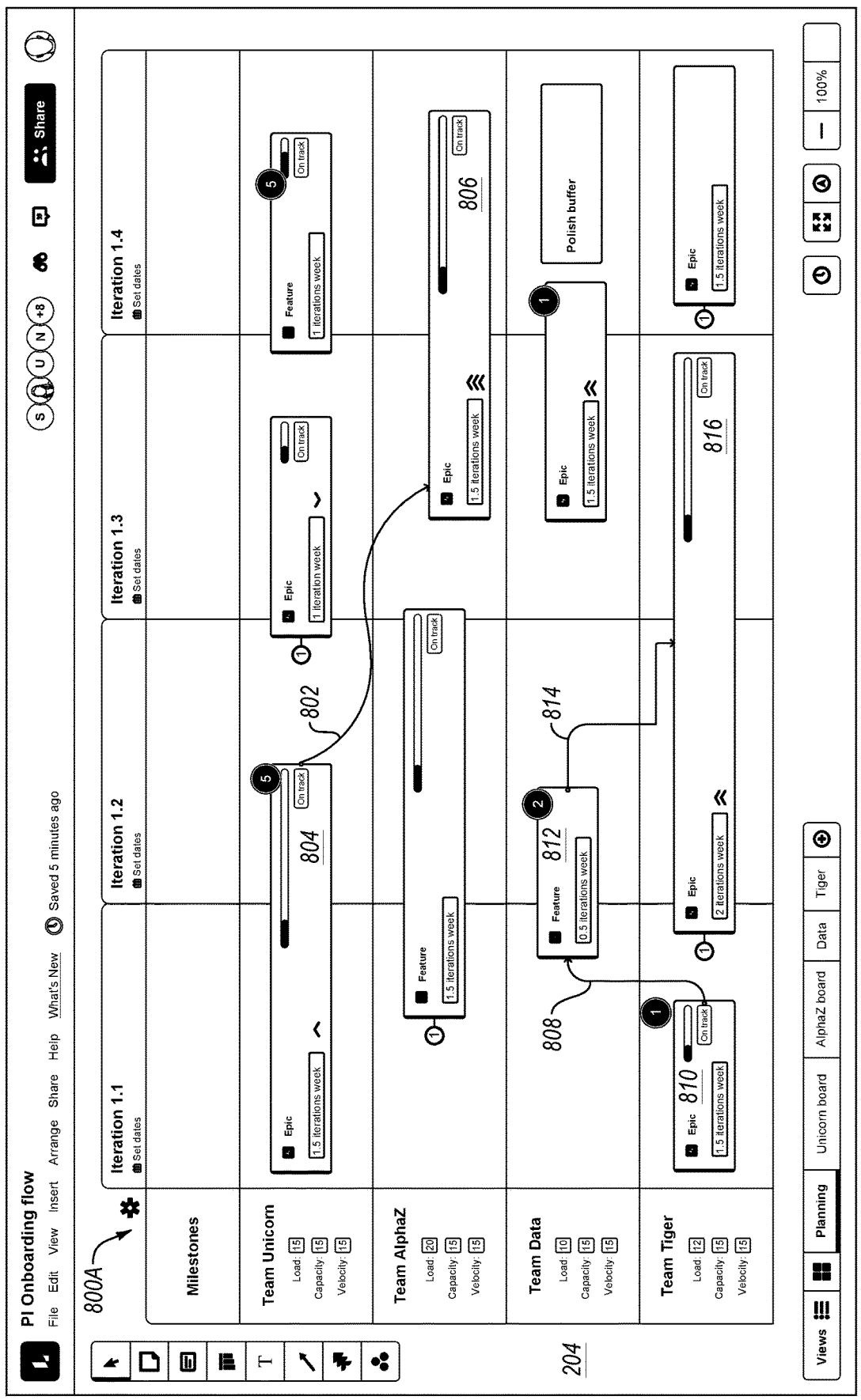
FIGS. 8A and 8B include the graphical representation of the UI of FIG. 2 with graphical matrices that have graphical objects with dependencies.
Figure 8B:
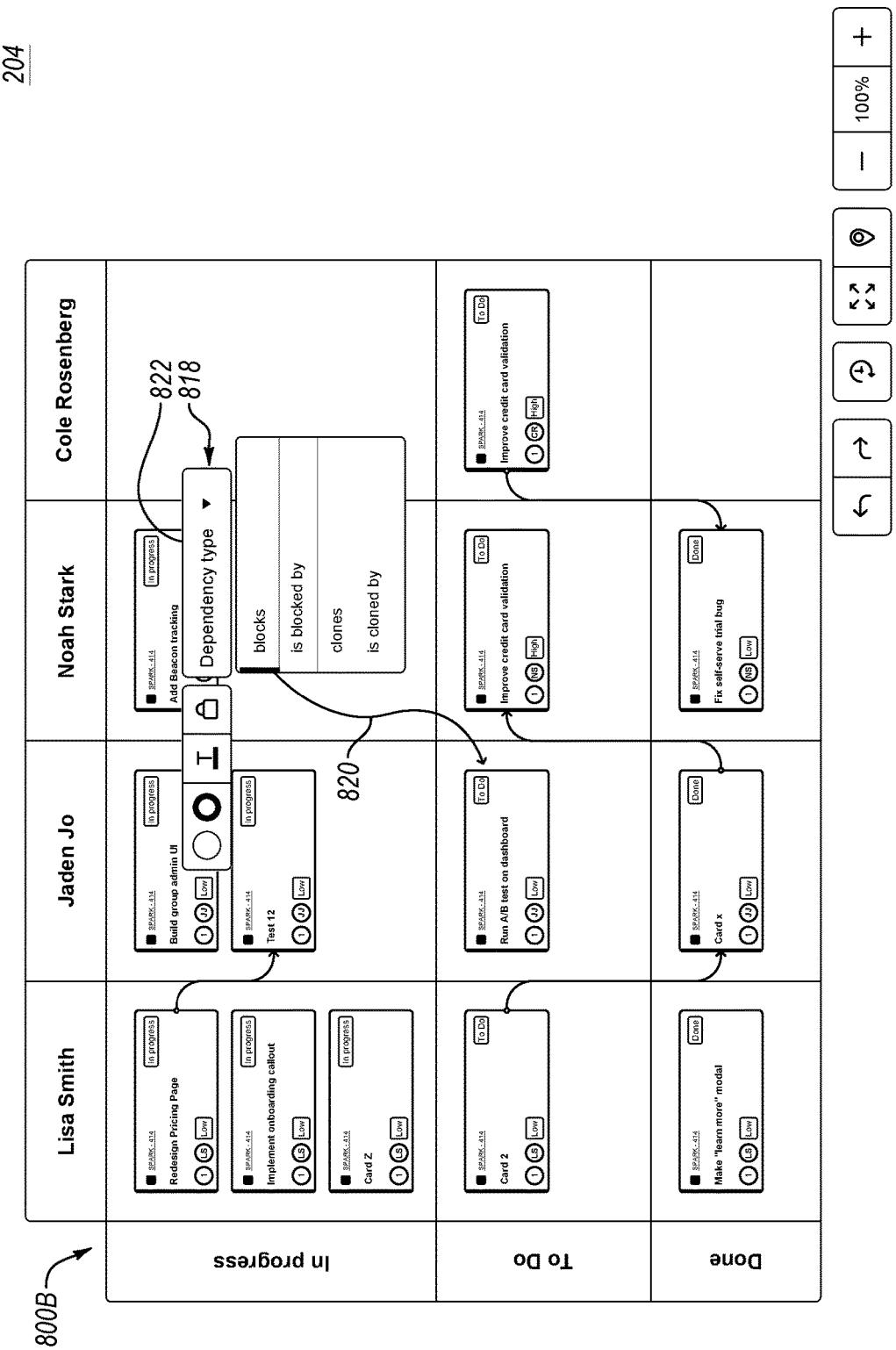

FIGS. 8A and 8B include the graphical representation of the UI of FIG. 2 with graphical matrices 800A, 800B shown on the canvas 204. FIGS. 8A and 8B depict dependencies among graphical objects, e.g., using connectors in this example. Such connectors may be referred to as dependency connectors when they are indicative of a dependency. FIG. 8A depicts a first dependency connector 802 that begins at a graphical object 804 and ends at a graphical object 806, indicating that the graphical object 806 depends on the graphical object 804. A second dependency connector 808 begins at a graphical object 810 and ends at a graphical object 812, indicating that the graphical object 812 depends on the graphical object 810. A third dependency connector 814 begins at the graphical object 812 and ends at a graphical object 816, indicating that the graphical object 816 depends on the graphical object 812. Dependencies are similarly depicted in FIG. 8B.

FIG. 8B further illustrates an example UI to change dependencies of graphical objects. In this example, a dependency menu bar 818 may be displayed, e.g., when a dependency connector 820 is selected. The menu bar 818 may include dependency drop down menu 822. When expanded, the dependency drop down menu 822 may show a current value of a dependency attribute indicated by the dependency connector 820 (e.g., "blocks" in this example). The expanded dependency drop down menu 822 may additionally show other values for the dependency attribute that may be selected. In the example of FIG. 8B, the other values for the dependency attribute include "is blocked by", "clones", and "is cloned by". When the value of the dependency attribute is changed, the change may be propagated back to a corresponding data source, as described elsewhere herein.

Alternatively or additionally, embodiments herein may allow dependencies to be added to graphical objects. For example, a menu bar displayed when a graphical object is selected may include an option to add a dependency. Selection of the option may present a UI to guide a user through selecting a value for the dependency and another graphical object to be at an opposite end of the dependency from the selected graphical object. When a dependency is added to a graphical object, the change (e.g., the dependency) may be propagated back to a corresponding data source, as described elsewhere herein.

According to some embodiments, formulas may be built into row headers and/or column headers of a graphical matrix that may run automatic calculations based on underlying data of the contents of the graphical matrix and may include an output of the formula in the row or column header. The underlying data may, e.g., be included in attribute schemas of the graphical objects in the graphical matrix. For example, FIG. 8A depicts a calculation for "Load" in each of the row headers. Each of the graphical objects in FIG. 8A may include an effort estimate attribute. The "Load" value in each of the row headers may include a summation of the values of the effort estimate attribute across all graphical objects within each corresponding row. For instance, a summation of the value of the effort estimate attribute across all three graphical objects in the Team Unicorn row may be 15. Alternatively or additionally, a color or other aspect of the output of each formula may change, e.g., turn from black to red, when the output exceeds a corresponding threshold. For example, if the threshold is 18, the Load value of 20 in the Team AlphaZ row may be shown in red to indicate that it exceeds the threshold while the Load values in the other rows may be shown in black since they are all less than the threshold.

Referring to FIG. 1, according to some embodiments, changes to graphical objects and/or their attribute schemas within the collaboration space 112 may be propagated back to data of the corresponding data source 118. The changes may be propagated back to the data source 118 automatically as the user makes changes in the collaboration space 112, periodically, in response to predefined inputs or events such as when the user closes the collaboration space 112, or the like. Alternatively or additionally, all changes in the collaboration space 112 may be held without being propagated back to the data source 118 until explicitly approved by the user. For example, the collaboration space 112 may keep a change file or other data structure of all changes to graphical objects or their attribute schemas that may lead to corresponding changes at the data source 118 and the browser 128 may push some or all of the changes back to the data source 118 (e.g., via the server 102) after the user reviews the change filed and authorizes some or all of the changes to be propagated back to the data source 118.

Alternatively or additionally, updates may be propagated in the opposite direction. For example, if data is changed at the data source 118, those changes may be propagated to the collaboration space 112. In some embodiments, the user may be interested in only a subset of the data and corresponding changes at the data source 118. In these and other embodiments, the user may set one or more presets to pull or push a subset of the data in or out of the data source 118. For example, if the user is a team leader of a team and the data source 118 includes data for multiple teams, the user may set a preset to pull or push data of the user's team only (such as all tickets that have an Assignee that is on the user's team) from or to the data source 118. Such presets may be set for the collaboration space 112 as a whole and/or for individual graphical matrices (such as the graphical matrices 202, 600) or other visualizations within the collaboration space 112.

Some embodiments allow collaboration spaces such as the collaboration space 112 to generate visualizations from a single data source 118 at a time, e.g., using data from a single data source 118. In other embodiments, collaboration spaces may be configured to generate visualizations from multiple data sources 118, e.g., simultaneously using data from multiple data sources 118. In these and other embodiments, the collaboration application 114 may map or translate attribute schemas from one data source 118 to another and/or may standardize attribute schemas from disparate data sources 118. This may permit data from multiple data sources 118 to be used simultaneously to generate visualizations in the same collaboration space.

Figure 9:
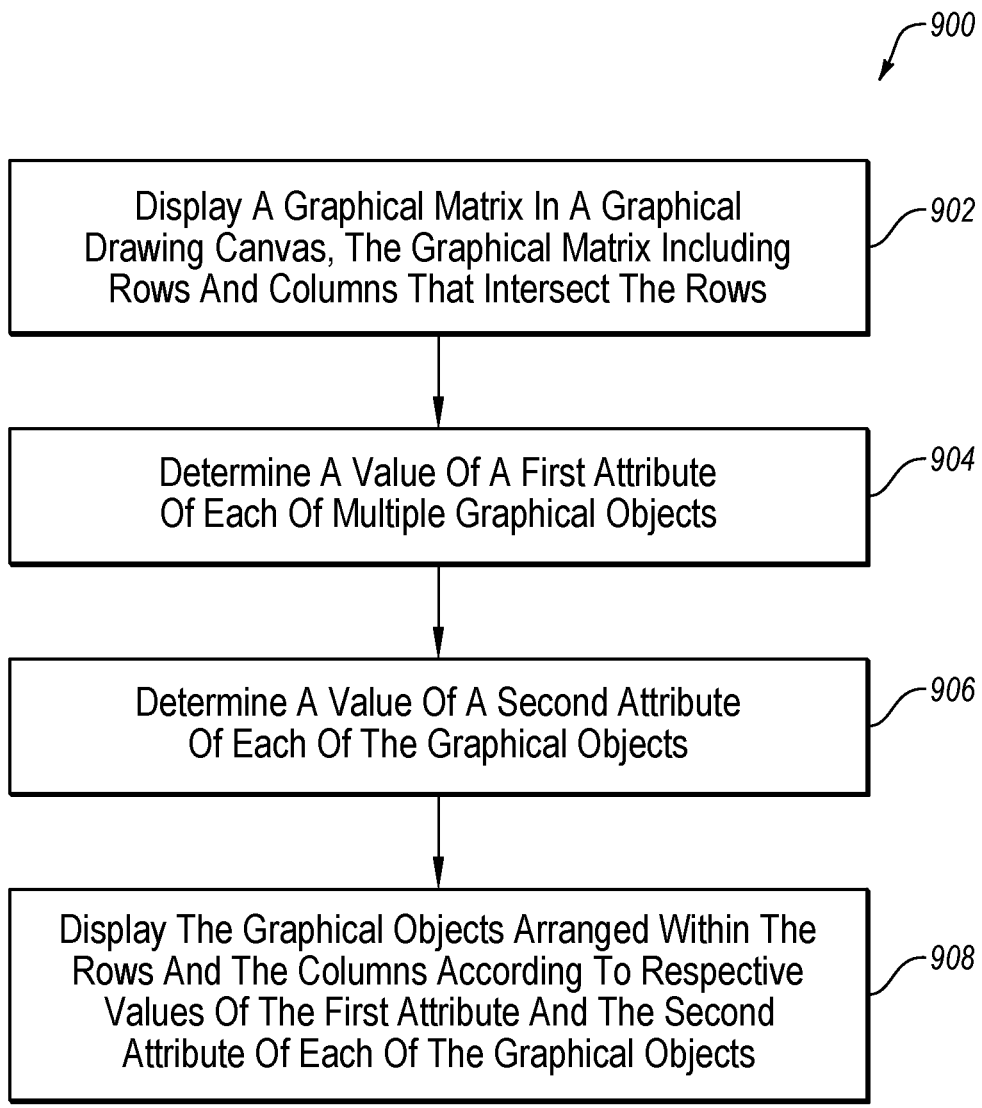
FIG. 9 illustrates a flowchart of an example method to organize graphical objects.

FIG. 9 illustrates a flowchart of an example method 900 to organize graphical objects, arranged in accordance with at least one embodiment described herein. The method 900 may be performed by any suitable system, apparatus, or device. For example, any one or more of the client devices 104, 106, 108, the collaboration application 114, and/or the server 102 of FIG. 1 may perform or direct performance of one or more of the operations associated with the method 900. In these and other embodiments, the method 900 may be performed or controlled by one or more processors based on one or more computer-readable instructions stored on one or more non-transitory computer-readable media. The method 900 may include one or more of blocks 902, 904, 906, and/or 908.

At block 902, the method 900 may include displaying a graphical matrix in a graphical drawing canvas, the graphical matrix including rows and columns that intersect the rows. The rows may include at least first and second rows and the columns may include at least first and second columns. For example, displaying the graphical matrix at block 902 may include displaying graphical matrix 202 of FIG. 2. The first and second rows may include the Backlog row and the Done row. The first and second columns may include the Diego de Oliveira column and the Emily Lucidchart column. Block 902 may be followed by block 904.

At block 904, the method 900 may include determining a value of a first attribute of each of multiple graphical objects. For example, determining the value of the first attribute of each of multiple graphical objects at block 904 may include determining the value of the Assignee attribute of each of the graphical objects 258, 260, 262, 264, 266, 268 of FIG. 2. Block 904 may be followed by block 906.

At block 906, the method 900 may include determining a value of a second attribute of each of the graphical objects. For example, determining the value of the second attribute of each of the graphical objects at block 906 may include determining the value of the Status attribute of each of the graphical objects 258, 260, 262, 264, 266, 268 of FIG. 2. Block 906 may be followed by block 908.

At block 908, the method 900 may include displaying the graphical objects arranged within the rows and columns according to respective values of the first attribute and the second attribute of each of the graphical objects. Block 908 may include displaying each of the graphical objects with a first value for the first attribute and a second value for the second attribute in the first column and the first row. For example, each of the graphical objects that has a value of Diego de Oliveira for the Assignee attribute and a value of Backlog for the Status attribute may be displayed in the cell at the intersection of the Diego de Oliveira column and the Backlog row in FIG. 2. None of the graphical objects in FIG. 2 includes both values of Diego de Oliveira and Backlog so there are no graphical objects shown in this cell in FIG. 2. Block 908 may alternatively or additionally include displaying each of the graphical objects with a third value for the first attribute and the second value for the second attribute in the second column and the first row. For example, each of the graphical objects, including the graphical object 258, that has a value of Emily Lucidchart for the Assignee attribute and the value of Backlog for the Status attribute may be displayed in the cell at the intersection of the Emily Lucidchart column and the Backlog row in FIG. 2. Block 908 may alternatively or additionally include displaying each of the graphical objects with the first value for the first attribute and a fourth value for the second attribute in the first column and the second row. For example, each of the graphical objects, including the graphical object 260, that has a value of Diego de Oliveira for the Assignee attribute and the value of Done for the Status attribute may be displayed in the cell at the intersection of the Diego de Oliveira column and the Done row in FIG. 2. Block 908 may alternatively or additionally include displaying each of the graphical objects with the third value for the first attribute and the fourth value for the second attribute in the second column and the second row. For example, each of the graphical objects that has a value of Emily Lucidchart for the Assignee attribute and the value of Done for the Status attribute may be displayed in the cell at the intersection of the Emily Lucidchart column and the Done row in FIG. 2. None of the graphical objects in FIG. 2 includes both values of Emily Lucidchart and Done so there are no graphical objects shown in this cell in FIG. 2.

Alternatively or additionally, block 908 of the method 900 may include distributing the graphical objects along the vertical axis across the at least two rows according to their respective values for the second attribute and distributing the graphical objects along the horizontal axis across the at least two columns according to their respective values for the first attribute. In the embodiment of FIG. 2, for instance, the graphical objects 258, 260, 262, 264, 266, 268 are distributed vertically (e.g., along the vertical axis) across three rows according to their values for the Status attribute. For example, graphical objects such as the graphical object 258 with a value of Backlog for the Status attribute are displayed in the Backlog (top) row of FIG. 2, graphical objects such as the graphical object 260 with a value of Done for the Status attribute are displayed in the Done (middle) row of FIG. 2, and graphical objects such as the graphical objects 262, 264, 266, 268 with a value of In Progress for the Status attribute are displayed in the In Progress (bottom) row of FIG. 2. Similarly, the graphical objects 258, 260, 262, 264, 266, 268 are distributed horizontally (e.g., along the horizontal axis) across three columns according to their values for the Assignee attribute. For example, graphical objects such as the graphical objects 260, 262 with a value of Diego de Oliveira for the Assignee attribute are displayed in the Diego de Oliveira (left) column of FIG. 2, graphical objects such as the graphical objects 258, 264 with a value of Emily Lucidchart for the Assignee attribute are displayed in the Emily Lucidchart (middle) column of FIG. 2, and graphical objects such as the graphical objects 266, 268 with a value of Kirsten Kitchen for the Assignee attribute are displayed in the Kirsten Kitchen (right) column of FIG. 2.

In some embodiments, the rows are stacked along a vertical axis of the graphical matrix and the columns are stacked along a horizontal axis of the graphical matrix. The method 900 may further include, prior to determining the value of the first attribute and the value of the second attribute of each of the graphical objects, determining that the first attribute is assigned to the horizontal axis and the second attribute is assigned to the vertical axis. The value of the first attribute of each of the graphical objects may be determined in response to determining that the first attribute is assigned to the horizontal axis. The value of the second attribute of each of graphical objects may be determined in response to determining that the second attribute is assigned to the vertical axis. For example, as shown in FIG. 2, the Backlog, Done, and In Progress rows are stacked vertically along the vertical axis of the graphical matrix 202 and the Diego de Oliveira, Emily Lucidchart, and Kirsten Kitchen columns are stacked horizontally along the horizontal axis of the graphical matrix 202. The method 900 may further include determining that the Assignee attribute is assigned to the horizontal axis and the Status attribute is assigned to the vertical axis prior to determining values of the Assignee and Status attribute of each of the graphical objects 258, 260, 262, 264, 266, 268. The value of the Assignee attribute of each of the graphical objects 258, 260, 262, 264, 266, 266 may be determined in response to determining that the Assignee attribute is assigned to the horizontal axis. Similarly, the value of the Status attribute of each of the graphical objects 258, 260, 262, 264, 266, 266 may be determined in response to determining that the Status attribute is assigned to the horizontal axis.

In some embodiments, the method 900 may further include receiving input to assign a different attribute to the horizontal axis or the vertical axis in place of the first attribute or the second attribute. The method 900 may further include rearranging the graphical matrix to include a number of rows or a number of columns equal to a number of values for the different attribute. The method 900 may further include rearranging the graphical objects within the rows and the columns of the rearranged graphical matrix according to respective values of the different attribute of each of the graphical objects. For example, as described with respect to FIGS. 4A-4E, assigning the Priority attribute to the vertical axis and/or the Issue Type to the horizontal axis of the graphical matrix 202 may change a number and/or labels of the rows and/or columns of the graphical matrix 202, which may be rearranged accordingly and the graphical objects 258, 260, 262, 264, 266, 268 may be rearranged within the rearranged graphical matrix 202 according to their values for the Priority attribute and/or the Issue Type attribute.

Alternatively or additionally, the method 900 may further include receiving input to turn off an attribute assignment to one of the horizontal axis or the vertical axis. In response to receiving input to turn off the attribute assignment to the horizontal axis, the method 900 may further include collapsing the columns into a single column such that the graphical objects previously distributed across the columns are displayed within the single column. In response to receiving input to turn off the attribute assignment to the vertical axis, the method 900 may further include collapsing the rows into a single row such that the graphical objects previously distributed across the rows are displayed within the single row. An example of the foregoing is illustrated and described with respect to FIG. 4F.

In some embodiments, the method 900 may further include storing attribute schemas of the graphical objects. Each of the attribute schemas may include values for attributes of a corresponding one of the graphical objects. The attributes may include at least the first attribute and the second attribute. For example, the attribute schemas illustrated in FIGS. 3 and 6A may be stored, e.g., in the structured source data 116 at the server 102 of FIG. 1.

In these and other embodiments, the method 900 may further include receiving input to position a first graphical object inside the graphical matrix within a given row of the plurality of rows and a given column of the plurality of columns. In response to receiving the input to position the first graphical object within the given row and the given column, the method 900 may further include displaying the first graphical object within the given row and the given column; and generating or updating a first attribute schema for the first graphical object to include a value for the first attribute that corresponds to the given column within which the first graphical object is positioned and to include a value for the second attribute that corresponds to the given row within which the first graphical object is positioned. An example of the foregoing embodiment is described with respect to FIG. 5B.

Alternatively or additionally, the method 900 may further include generating a given attribute schema for a given graphical object from data at a data source. The method 900 may further include receiving input to change a value of a given attribute of the given graphical object. The method 900 may further include updating the data at the data source to reflect the change to the given attribute. In some embodiments, in response to the data at the data source being modified, the method 900 may include updating the given attribute schema for the given graphical object based on the modification of the data. In response to the update of the given attribute schema for the given graphical object changing a value of the first attribute or the second attribute for the given graphical object, the method 900 may further include rearranging the graphical matrix to display the given graphical object in a different column or row corresponding to the changed value of the first attribute or the second attribute.

In some embodiments, the method 900 may further include displaying a table in or near the graphical drawing canvas that includes cells for values for the attributes of at least one of the graphical objects. In response to changing, at a given graphical object, a value for the first attribute or the second attribute of the given graphical object, the method 900 may further include updating the corresponding cell in the table for the first attribute or the second attribute of the given graphical object to include the changed value.

In response to changing, at the corresponding cell of the table, the value for the first attribute or the second attribute of the given graphical object, rearranging the graphical matrix to display the given graphical object in a different column or row corresponding to the changed value of the first attribute or the second attribute. For example, some or all of the attribute schemas illustrated in FIGS. 3 and 6A may be displayed to the user, e.g., in a table; if the user updates/changes any attribute values at the graphical object itself, the corresponding cells in the table may be updated; if the user updates/changes any attribute values in cells of the table and the values are for an attribute assigned to one of the axes of the graphical matrix, the graphical matrix may be rearranged accordingly.

Alternatively or additionally, the method 900 may further include receiving input to change a shape type of a given graphical object from a first shape type to a second shape type. The given graphical object may include a given attribute schema. The method 900 may further include updating a shape type field in the given attribute schema of the given graphical object from the first shape type to the second shape type. The method 900 may further include updating the given graphical object displayed in the graphical drawing canvas to have the second shape type. Examples of changing shape type of a graphical object are described with respect to FIGS. 5A-5D.

In some embodiments, the method 900 may further include receiving input to specify a filter parameter. The method 900 may further include analyzing the attribute schemas of the graphical objects based on the filter parameter to identify a first subset of the graphical objects that satisfy the filter parameter and a second subset of the graphical objects that fail to satisfy the filter parameter. The method 900 may further include altering the graphical matrix in accordance with the filter parameter, including altering the graphical matrix to continue displaying one of the first or second subsets of the graphical objects while hiding the other one of the first or second subsets of the graphical objects. For example, as described with respect to FIG. 7A, a user may specify one or more filter parameters via the filter menu 704 or other UI and application of the filter parameters may rearrange the graphical matrix to continue showing graphical objects that satisfy the filter parameters while hiding graphical objects that fail to satisfy the filter parameters.

In some embodiments, a given attribute schema for a given graphical object may be generated from data at two or more different data sources.

In some embodiments, possible values of the first attribute or the second attribute span a continuum that includes multiple value ranges. When the possible values of the first attribute span the continuum, each column may span a different non-overlapping value range within the continuum. When the possible values of the second attribute span the continuum, each row may span a different non-overlapping value range within the continuum.

The method 900 may further include receiving input to change a size of each of the value ranges from a first size to a second size. The method 900 may further include at least one of: when the possible values of the first attribute span the continuum, rearranging the graphical matrix to include columns that span different non-overlapping value ranges of the second size; or when the possible values of the second attribute span the continuum, rearranging the graphical matrix to include rows that span different non-overlapping value ranges of the second size. The method 900 may further include rearranging the plurality of graphical objects within the rearranged graphical matrix according to respective values of the first attribute and the second attribute of each of the plurality of graphical objects. FIGS. 6A-6C show an example in which the columns span different non-overlapping value ranges of time and the size of the value ranges may be changed, e.g., between non-overlapping ranges of quarters, months, and weeks. In the example of FIGS. 6A-6C, when the value of the time ranges is changed (e.g., from quarters to months), the graphical matrix 600 is rearranged to have corresponding columns for each non-overlapping time range and the graphical objects 601-611 are rearranged within the rearranged graphical matrix 600, and specifically within the rearranged columns, according to their respective values for the Due Date attribute.

Alternatively or additionally, the method 900 may further include receiving input to increase granularity of a given column or a given row to finer granularity. The method 900 may further include dividing the given column or the given row into multiple sub-columns or multiple sub-rows. The method 900 may further include rearranging graphical objects of the given row or the given column within the sub-columns or the sub-rows according to respective values of the first attribute and the second attribute of each of the graphical objects of the given row or the given column. For example, referring to FIGS. 6B and 6C, the user may select the March 2021 column in FIG. 6B for expansion, e.g., to have greater granularity. The March 2021 column may then be expanded to multiple sub-columns, e.g., the week columns of FIG. 6C, with the graphical objects 602, 604, 610, 608, 611 arranged within the week columns according to their respective values for the Due Date attribute.

In some embodiments, the method 900 may further include determining a dependency of a first graphical object on a second graphical object. The method 900 may further include displaying the dependency of the first graphical object on the second graphical object in the graphical matrix. For example, FIG. 8A shows the dependency of the graphical object 806 on the graphical object 804 with the dependency connector 802.

In some embodiments, a given graphical object may have at least two values for the first attribute or the second attribute. When the given graphical object has at least two values for the first attribute, displaying the graphical objects arranged within the rows and the columns according to respective values of the first attribute and the second attribute of each of the graphical objects may include replicating the given graphical object to appear in each of at least two columns that correspond to the at least two values for the first attribute. When the given graphical object has at least two values for the second attribute, displaying the graphical objects arranged within the rows and the columns according to respective values of the first attribute and the second attribute of each of the graphical objects may include replicating the given graphical object to appear in each of at least two rows that correspond to the at least two values for the second attribute.

In some embodiments, the graphical matrix is a first graphical matrix. The method may further include displaying a second graphical matrix in the graphical drawing canvas. The second graphical matrix may include rows and columns and one or more of the graphical objects displayed within the rows and columns of the second graphical matrix according to respective values of a third attribute and a fourth attribute of each of the one or more of the graphical objects. The one or more of the graphical objects may include a first graphical object. The first graphical object may be displayed in both the first graphical matrix and the second graphical matrix. In response to the first graphical object being updated in the first graphical matrix or the second graphical matrix, the method 900 may further include mirroring the update to the first graphical object in the other of the second graphical matrix or the first graphical matrix.

Figure 10:
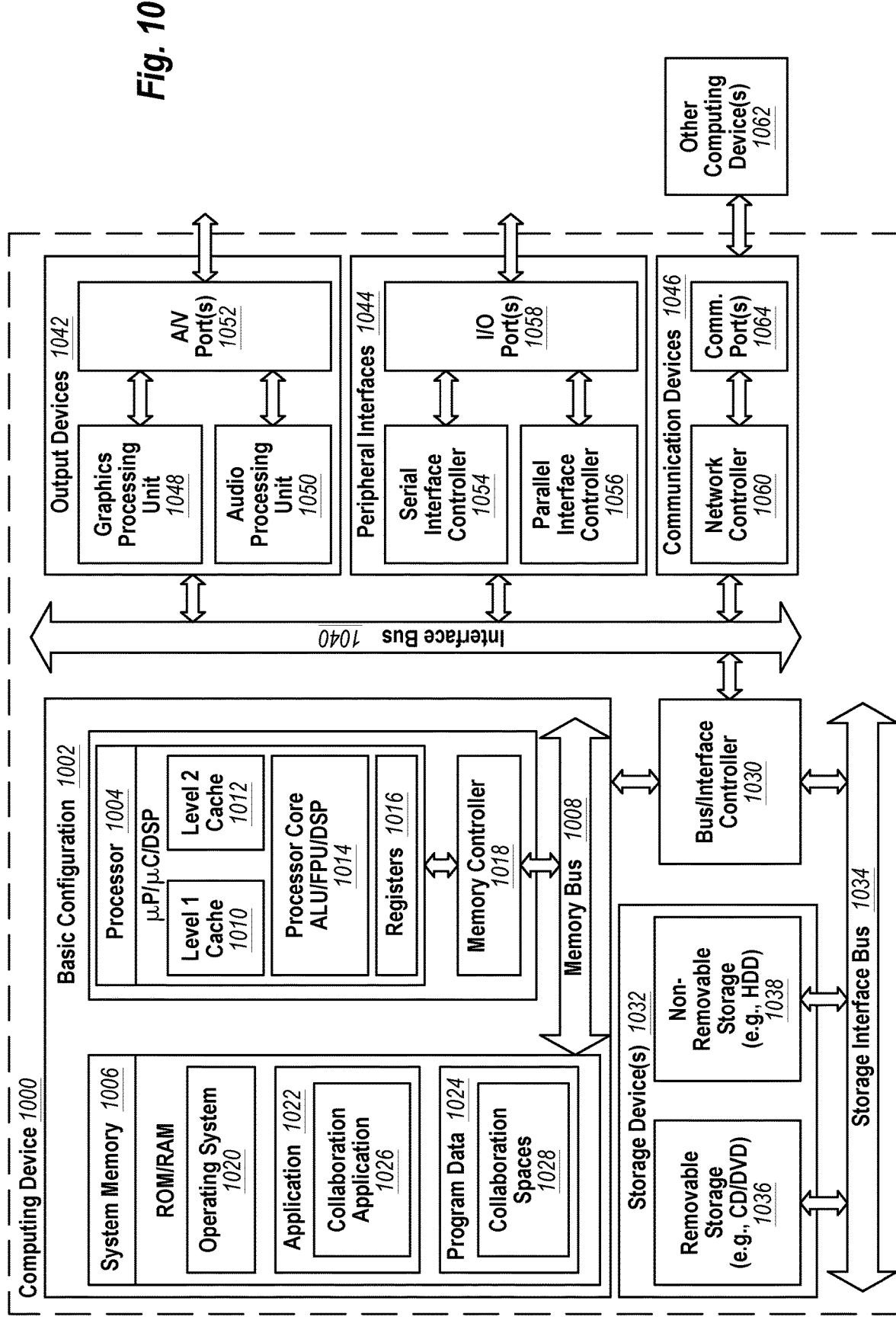
FIG. 10 is a block diagram illustrating an example computing device that is arranged to organize graphical objects, all arranged in accordance with at least one embodiment described herein.

FIG. 10 is a block diagram illustrating an example computing device 1000 that is arranged to organize graphical objects, arranged in accordance with at least one embodiment described herein. The computing device 1000 may include, be included in, or otherwise correspond to either or both of the server 102 or the client devices 104, 106, 108 of FIG. 1. In a basic configuration 1002, the computing device 1000 typically includes one or more processors 1004 and a system memory 1006. A memory bus 1008 may be used to communicate between the processor 1004 and the system memory 1006.

Depending on the desired configuration, the processor 1004 may be of any type including, but not limited to, a microprocessor (µP), a microcontroller (µC), a digital signal processor (DSP), or any combination thereof. The processor 1004 may include one or more levels of caching, such as a level one cache 1010 and a level two cache 1012, a processor core 1014, and registers 1016. The processor core 1014 may include an arithmetic logic unit (ALU), a floating point unit (FPU), a digital signal processing core (DSP Core), or any combination thereof. An example memory controller 1018 may also be used with the processor 1004, or in some implementations the memory controller 1018 may include an internal part of the processor 1004.

Depending on the desired configuration, the system memory 1006 may be of any type including volatile memory (such as RAM), nonvolatile memory (such as ROM, flash memory, etc.), or any combination thereof. The system memory 1006 may include an operating system 1020, one or more applications 1022, and program data 1024. The application 1022 may include a collaboration application 1026 that is arranged to organize graphical objects as described herein. The collaboration application 1026 may include, be included in, or otherwise correspond to the collaboration application 114 of FIG. 1. The program data 1024 may include collaboration spaces 1028 (which may include, be included in, or otherwise correspond to the collaboration spaces 112 of FIG. 1) as is described herein, structured source data collections (such as structured source data 116, 300, 612 of FIGS. 1, 3, 6A), models of structured source data (such as models 124 of FIG. 1) and/or other collaboration data. In some embodiments, the application 1022 may be arranged to operate with the program data 1024 on the operating system 1020 such that one or more methods may be provided as described herein.

The computing device 1000 may have additional features or functionality, and additional interfaces to facilitate communications between the basic configuration 1002 and any involved devices and interfaces. For example, a bus/interface controller 1030 may be used to facilitate communications between the basic configuration 1002 and one or more data storage devices 1032 via a storage interface bus 1034. The data storage devices 1032 may be removable storage devices 1036, non-removable storage devices 1038, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 1006, the removable storage devices 1036, and the non-removable storage devices 1038 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 1000. Any such computer storage media or non-transitory computer-readable media may be part of the computing device 1000.

The computing device 1000 may also include an interface bus 1040 to facilitate communication from various interface devices (e.g., output devices 1042, peripheral interfaces 1044, and communication devices 1046) to the basic configuration 1002 via the bus/interface controller 1030. The output devices 1042 include a graphics processing unit 1048 and an audio processing unit 1050, which may be configured to communicate to various external devices such as a display or speakers via one or more A/V ports 1052. Diagrams, flowcharts, organizational charts, connectors, and/or other graphical objects generated by the diagram application 1026 may be output through the graphics processing unit 1048 to such a display. The peripheral interfaces 1044 include a serial interface controller 1054 or a parallel interface controller 1056, which may be configured to communicate with external devices such as input devices (e.g., keyboard, mouse, pen, voice input device, touch input device, etc.), sensors, or other peripheral devices (e.g., printer, scanner, etc.) via one or more I/O ports 1058. Such input devices may be operated by a user to provide input to the diagram application 1026, which input may be effective to, e.g., generate curved connectors, designate points as designated points of one or more curved connectors, relocate one or more designated points, and/or to accomplish other operations within the diagram application 1026. The communication devices 1046 include a network controller 1060, which may be arranged to facilitate communications with one or more other computing devices 1062 over a network communication link via one or more communication ports 1064.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 1000 may be implemented as a portion of a small-form factor portable (or mobile) electronic device such as a smartphone, a personal data assistant (PDA) or an application-specific device. The computing device 1000 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to organize graphical objects, the method comprising:
displaying a graphical matrix in a graphical drawing canvas, the graphical matrix including a plurality of rows and a plurality of columns that intersect the plurality of rows;
determining a value of a first attribute of each of a plurality of graphical objects;
determining a value of a second attribute of each of the plurality of graphical objects;
displaying the plurality of graphical objects arranged within the plurality of rows and the plurality of columns according to respective values of the first attribute and the second attribute of each of the plurality of graphical objects, wherein the plurality of rows are stacked along a vertical axis of the graphical matrix and the plurality of columns are stacked along a horizontal axis of the graphical matrix;
prior to determining the value of the first attribute and the value of the second attribute of each of the plurality of graphical objects, determining that the first attribute is assigned to the horizontal axis and the second attribute is assigned to the vertical axis, wherein:
the value of the first attribute of each of the plurality of graphical objects is determined in response to determining that the first attribute is assigned to the horizontal axis; and
the value of the second attribute of each of the plurality of graphical objects is determined in response to determining that the second attribute is assigned to the vertical axis;
receiving input to assign a different attribute to the horizontal axis or the vertical axis in place of the first attribute or the second attribute;
rearranging the graphical matrix to include a number of rows or a number of columns equal to a number of values for the different attribute; and
rearranging the plurality of graphical objects within the plurality of rows and the plurality of columns of the rearranged graphical matrix according to respective values of the different attribute of each of the plurality of graphical objects.

2. A method to organize graphical objects, the method comprising:
displaying a graphical matrix in a graphical drawing canvas, the graphical matrix including a plurality of rows and a plurality of columns that intersect the plurality of rows;
determining a value of a first attribute of each of a plurality of graphical objects;

determining a value of a second attribute of each of the plurality of graphical objects;

displaying the plurality of graphical objects arranged within the plurality of rows and the plurality of columns according to respective values of the first attribute and the second attribute of each of the plurality of graphical objects, wherein the plurality of rows are stacked along a vertical axis of the graphical matrix and the plurality of columns are stacked along a horizontal axis of the graphical matrix;

prior to determining the value of the first attribute and the value of the second attribute of each of the plurality of graphical objects, determining that the first attribute is assigned to the horizontal axis and the second attribute is assigned to the vertical axis, wherein:

the value of the first attribute of each of the plurality of graphical objects is determined in response to determining that the first attribute is assigned to the horizontal axis; and the value of the second attribute of each of the plurality of graphical objects is determined in response to determining that the second attribute is assigned to the vertical axis;

receiving input to turn off an attribute assignment to one of the horizontal axis or the vertical axis; and one of:

in response to receiving input to turn off the attribute assignment to the horizontal axis, collapsing the plurality of columns into a single column such that the graphical objects previously distributed across the plurality of columns are displayed within the single column; or in response to receiving input to turn off the attribute assignment to the vertical axis, collapsing the plurality of rows into a single row such that the graphical objects previously distributed across the plurality of rows are displayed within the single row.

3. The method of claim 1, further comprising storing a plurality of attribute schemas of the plurality of graphical objects, each of the plurality of attribute schemas including a plurality of values for a plurality of attributes of a corresponding one of the plurality of graphical objects, the plurality of attributes including at least the first attribute and the second attribute.

4. The method of claim 3, further comprising:

receiving input to position a first graphical object inside the graphical matrix within a given row of the plurality of rows and a given column of the plurality of columns; and in response to receiving the input to position the first graphical object within the given row and the given column:

displaying the first graphical object within the given row and the given column; and generating or updating a first attribute schema for the first graphical object to include a value for the first attribute that corresponds to the given column within which the first graphical object is positioned and to include a value for the second attribute that corresponds to the given row within which the first graphical object is positioned.

5. The method of claim 3, further comprising:

generating a given attribute schema of the plurality of attribute schemas for a given graphical object of the plurality of graphical objects from data at a data source;

receiving input to change a value of a given attribute of the plurality of attributes of the given graphical object; and updating the data at the data source to reflect the change to the given attribute.

6. The method of claim 3, wherein:

a given attribute schema of the plurality of attribute schemas for a given graphical object of the plurality of graphical objects is generated from data at a data source;

in response to the data at the data source being modified, updating the given attribute schema for the given graphical object based on the modification of the data; and in response to the update of the given attribute schema for the given graphical object changing a value of the first attribute or the second attribute for the given graphical object, rearranging the graphical matrix to display the given graphical object in a different column or row corresponding to the changed value of the first attribute or the second attribute.

7. The method of claim 3, further comprising:

displaying a table in or near the graphical drawing canvas that includes cells for values for the plurality of attributes of at least one of the plurality of graphical objects; and one of:

in response to changing, at a given graphical object, a value for the first attribute or the second attribute of the given graphical object, updating the corresponding cell in the table for the first attribute or the second attribute of the given graphical object to include the changed value; or in response to changing, at the corresponding cell of the table, the value for the first attribute or the second attribute of the given graphical object, rearranging the graphical matrix to display the given graphical object in a different column or row corresponding to the changed value of the first attribute or the second attribute.

8. A method to organize graphical objects, the method comprising:

displaying a graphical matrix in a graphical drawing canvas, the graphical matrix including a plurality of rows and a plurality of columns that intersect the plurality of rows;

determining a value of a first attribute of each of a plurality of graphical objects;

determining a value of a second attribute of each of the plurality of graphical objects;

displaying the plurality of graphical objects arranged within the plurality of rows and the plurality of columns according to respective values of the first attribute and the second attribute of each of the plurality of graphical objects;

storing a plurality of attribute schemas of the plurality of graphical objects, each of the plurality of attribute schemas including a plurality of values for a plurality of attributes of a corresponding one of the plurality of graphical objects, the plurality of attributes including at least the first attribute and the second attribute;

receiving input to change a shape type of a given graphical object of the plurality of graphical objects from a first shape type to a second shape type, the given graphical object including a given attribute schema of the plurality of attribute schemas;

updating a shape type field in the given attribute schema of the given graphical object from the first shape type to the second shape type; and updating the given graphical object displayed in the graphical drawing canvas to have the second shape type.

9. A method to organize graphical objects, the method comprising:

displaying a graphical matrix in a graphical drawing canvas, the graphical matrix including a plurality of rows and a plurality of columns that intersect the plurality of rows;

determining a value of a first attribute of each of a plurality of graphical objects;

determining a value of a second attribute of each of the plurality of graphical objects;

displaying the plurality of graphical objects arranged within the plurality of rows and the plurality of columns according to respective values of the first attribute and the second attribute of each of the plurality of graphical objects;

storing a plurality of attribute schemas of the plurality of graphical objects, each of the plurality of attribute schemas including a plurality of values for a plurality of attributes of a corresponding one of the plurality of graphical objects, the plurality of attributes including at least the first attribute and the second attribute;

receiving input to specify a filter parameter;

analyzing the plurality of attribute schemas of the plurality of graphical objects based on the filter parameter to identify a first subset of the plurality of graphical objects that satisfy the filter parameter and a second subset of the plurality of graphical objects that fail to satisfy the filter parameter; and altering the graphical matrix in accordance with the filter parameter, including altering the graphical matrix to continue displaying one of the first or second subsets of the plurality of graphical objects while hiding the other one of the first or second subsets of the plurality of graphical objects.

10. The method of claim 3, wherein a given attribute schema of the plurality of attribute schemas for a given graphical object of the plurality of graphical objects is generated from data at two or more different data sources.

11. The method of claim 1, wherein:

possible values of the first attribute or the second attribute span a continuum that includes a plurality of value ranges; and at least one of:

when the possible values of the first attribute span the continuum, each column of the plurality of columns spans a different non-overlapping value range of the plurality of value ranges within the continuum; or when the possible values of the second attribute span the continuum, each row of the plurality of rows spans a different non-overlapping value range of the plurality of value ranges within the continuum.

12. A method to organize graphical objects, the method comprising:

displaying a graphical matrix in a graphical drawing canvas, the graphical matrix including a plurality of rows and a plurality of columns that intersect the plurality of rows;

determining a value of a first attribute of each of a plurality of graphical objects;

determining a value of a second attribute of each of the plurality of graphical objects;

displaying the plurality of graphical objects arranged within the plurality of rows and the plurality of columns according to respective values of the first attribute and the second attribute of each of the plurality of graphical objects;

wherein:

possible values of the first attribute or the second attribute span a continuum that includes a plurality of value ranges; and at least one of:

when the possible values of the first attribute span the continuum, each column of the plurality of columns spans a different non-overlapping value range of the plurality of value ranges within the continuum; or when the possible values of the second attribute span the continuum, each row of the plurality of rows spans a different non-overlapping value range of the plurality of value ranges within the continuum; and the method further comprises:

receiving input to change a size of each of the plurality of value ranges from a first size to a second size;

at least one of:

when the possible values of the first attribute span the continuum, rearranging the graphical matrix to include columns that span different non-overlapping value ranges of the second size; or when the possible values of the second attribute span the continuum, rearranging the graphical matrix to include rows that span different non-overlapping value ranges of the second size; and rearranging the plurality of graphical objects within the rearranged graphical matrix according to respective values of the first attribute and the second attribute of each of the plurality of graphical objects.

13. A method to organize graphical objects, the method comprising:

displaying a graphical matrix in a graphical drawing canvas, the graphical matrix including a plurality of rows and a plurality of columns that intersect the plurality of rows;

determining a value of a first attribute of each of a plurality of graphical objects;

determining a value of a second attribute of each of the plurality of graphical objects;

displaying the plurality of graphical objects arranged within the plurality of rows and the plurality of columns according to respective values of the first attribute and the second attribute of each of the plurality of graphical objects;

wherein:

possible values of the first attribute or the second attribute span a continuum that includes a plurality of value ranges; and at least one of:

when the possible values of the first attribute span the continuum, each column of the plurality of columns spans a different non-overlapping value range of the plurality of value ranges within the continuum; or when the possible values of the second attribute span the continuum, each row of the plurality of rows spans a different non-overlapping value range of the plurality of value ranges within the continuum; and the method further comprises:

receiving input to increase granularity of a given column or a given row to finer granularity;

dividing the given column or the given row into a plurality of sub-columns or a plurality of sub-rows; and rearranging graphical objects of the given row or the given column within the plurality of sub-columns or the plurality of sub-rows according to respective values of the first attribute and the second attribute of each of the graphical objects of the given row or the given column.

14. The method of claim 1, further comprising:

determining a dependency of a first graphical object of the plurality of objects on a second graphical object of the plurality of graphical objects; and displaying the dependency of the first graphical object on the second graphical object in the graphical matrix.

15. The method of claim 1, wherein:

a given graphical object of the plurality of graphical objects has at least two values for the first attribute or the second attribute; and one of:

when the given graphical object has at least two values for the first attribute, displaying the plurality of graphical objects arranged within the plurality of rows and the plurality of columns according to respective values of the first attribute and the second attribute of each of the plurality of graphical objects includes replicating the given graphical object to appear in each of at least two columns of the plurality of columns that correspond to the at least two values for the first attribute; or when the given graphical object has at least two values for the second attribute, displaying the plurality of graphical objects arranged within the plurality of rows and the plurality of columns according to respective values of the first attribute and the second attribute of each of the plurality of graphical objects includes replicating the given graphical object to appear in each of at least two rows of the plurality of rows that correspond to the at least two values for the second attribute.

16. The method of claim 1, wherein:

the graphical matrix comprises a first graphical matrix;

the method further comprises displaying a second graphical matrix in the graphical drawing canvas, the second graphical matrix including rows and columns and one or more of the plurality of graphical objects displayed within the rows and columns of the second graphical matrix according to respective values of a third attribute and a fourth attribute of each of the one or more of the plurality of graphical objects;

the one or more of the plurality of graphical objects includes a first graphical object;

the first graphical object is displayed in both the first graphical matrix and the second graphical matrix; and in response to the first graphical object being updated in the first graphical matrix or the second graphical matrix, the method further includes mirroring the update to the first graphical object in the other of the second graphical matrix or the first graphical matrix.

17. A non-transitory computer-readable medium having computer-readable instructions stored thereon that are executable by a processor to perform or control performance of operations comprising:

displaying a graphical matrix in a graphical drawing canvas, the graphical matrix including a plurality of rows and a plurality of columns that intersect the plurality of rows;

determining a value of a first attribute of each of a plurality of graphical objects;

determining a value of a second attribute of each of the plurality of graphical objects; and displaying the plurality of graphical objects arranged within the plurality of rows and the plurality of columns according to respective values of the first attribute and the second attribute of each of the plurality of graphical objects;

wherein:

a given graphical object of the plurality of graphical objects has at least two values for the first attribute or the second attribute; and one of:

when the given graphical object has at least two values for the first attribute, displaying the plurality of graphical objects arranged within the plurality of rows and the plurality of columns according to respective values of the first attribute and the second attribute of each of the plurality of graphical objects includes replicating the given graphical object to appear in each of at least two columns of the plurality of columns that correspond to the at least two values for the first attribute; or when the given graphical object has at least two values for the second attribute, displaying the plurality of graphical objects arranged within the plurality of rows and the plurality of columns according to respective values of the first attribute and the second attribute of each of the plurality of graphical objects includes replicating the given graphical object to appear in each of at least two rows of the plurality of rows that correspond to the at least two values for the second attribute.

18. A system to display a graphical diagram, the system comprising:

a processor; and a non-transitory computer-readable medium communicatively coupled to the processor and having computer-readable instructions stored thereon that are executable by the processor to perform or control performance of operations comprising:

displaying a graphical matrix in a graphical drawing canvas, the graphical matrix including a plurality of rows and a plurality of columns that intersect the plurality of rows;

determining a value of a first attribute of each of a plurality of graphical objects;

determining a value of a second attribute of each of the plurality of graphical objects; and displaying the plurality of graphical objects arranged within the plurality of rows and the plurality of columns according to respective values of the first attribute and the second attribute of each of the plurality of graphical objects;

wherein:

the graphical matrix comprises a first graphical matrix;

the operations further comprise displaying a second graphical matrix in the graphical drawing canvas, the second graphical matrix including rows and columns and one or more of the plurality of graphical objects displayed within the rows and columns of the second graphical matrix according to respective values of a third attribute and a fourth attribute of each of the one or more of the plurality of graphical objects;

the one or more of the plurality of graphical objects includes a first graphical object;

the first graphical object is displayed in both the first graphical matrix and the second graphical matrix; and in response to the first graphical object being updated in the first graphical matrix or the second graphical matrix, the method further includes mirroring the update to the first graphical object in the other of the second graphical matrix or the first graphical matrix.

* * * * *